United States Patent
Fujii et al.

(10) Patent No.: US 11,566,143 B2
(45) Date of Patent: Jan. 31, 2023

(54) IMAGE FORMING METHOD AND INK SET

(71) Applicant: FUJIFILM Corporation, Tokyo (JP)

(72) Inventors: Yusuke Fujii, Kanagawa (JP); Takeshi Miyato, Kanagawa (JP); Ayato Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 430 days.

(21) Appl. No.: 16/821,992

(22) Filed: Mar. 17, 2020

(65) Prior Publication Data

US 2020/0216703 A1 Jul. 9, 2020

Related U.S. Application Data

(63) Continuation of application No. PCT/JP2018/030315, filed on Aug. 14, 2018.

(30) Foreign Application Priority Data

Sep. 29, 2017 (JP) .............................. JP2017-190329

(51) Int. Cl.
*C09D 11/54* (2014.01)
*B41J 2/01* (2006.01)
(Continued)

(52) U.S. Cl.
CPC ................. *C09D 11/54* (2013.01); *B41J 2/01* (2013.01); *C09D 11/322* (2013.01); *C09D 11/36* (2013.01); *C09D 11/38* (2013.01)

(58) Field of Classification Search
CPC .... B41J 2/2107; B41J 2/2114; B41J 11/0015; B41J 2/01; C09D 11/322; C09D 11/38; C09D 11/54; C09D 11/40; C09D 11/36
See application file for complete search history.

(56) References Cited

U.S. PATENT DOCUMENTS

| 6,893,699 B2 | 5/2005 | Ito et al. |
| 9,878,541 B2 | 1/2018 | Maeda et al. |

(Continued)

FOREIGN PATENT DOCUMENTS

| CN | 1440333 | 9/2003 |
| CN | 105922778 | 9/2016 |

(Continued)

OTHER PUBLICATIONS

Office Action of Japan Counterpart Application, with English translation thereof, dated May 11, 2021, pp. 1-5.

(Continued)

*Primary Examiner* — Jannelle M Lebron
(74) *Attorney, Agent, or Firm* — JCIPRNET

(57) ABSTRACT

Provided are an image forming method including a step of preparing an ink which contains water and an organic solvent A having a vapor pressure of 0.20 kPa or less at 20° C. and in which a content of the organic solvent A is 10% by mass or greater, a step of preparing an aggregating liquid containing an aggregating agent, a step of preparing an overcoat liquid which contains a resin and an organic solvent B having a vapor pressure of 2.50 kPa or greater at 20° C. and in which a content of the organic solvent B is 10% by mass or greater, a step of applying the aggregating liquid onto an impermeable base material, a step of applying the ink to at least a portion of a region to which the aggregating liquid has been applied according to an ink jet method to form an image, and a step of applying the overcoat liquid onto the region to which the aggregating liquid has been applied in the impermeable base material, on which the image has been formed; and an ink set.

11 Claims, 2 Drawing Sheets

(51) Int. Cl.
*C09D 11/322* (2014.01)
*C09D 11/36* (2014.01)
*C09D 11/38* (2014.01)

(56) References Cited

U.S. PATENT DOCUMENTS

| | | |
|---|---|---|
| 2011/0234690 A1 | 9/2011 | Ooishi et al. |
| 2012/0128949 A1 | 5/2012 | Goto |
| 2012/0200651 A1 | 8/2012 | Sasada et al. |
| 2015/0103116 A1 | 4/2015 | Gotou |
| 2016/0222238 A1 | 8/2016 | Arai et al. |
| 2016/0250861 A1 | 9/2016 | Yano et al. |
| 2016/0289479 A1 | 10/2016 | Okuda |
| 2016/0297222 A1 | 10/2016 | Allington et al. |
| 2017/0355201 A1 | 12/2017 | Hojo |
| 2018/0079222 A1 | 3/2018 | Yano et al. |

FOREIGN PATENT DOCUMENTS

| | | |
|---|---|---|
| CN | 106947317 | 7/2017 |
| EP | 1302332 | 4/2003 |
| JP | 2015074184 | 4/2015 |
| JP | 2016120670 | 7/2016 |
| JP | 2016145312 | 8/2016 |
| JP | 2016179675 | 10/2016 |
| JP | 2016196177 | 11/2016 |
| JP | 2017222441 | 12/2017 |
| WO | 2018079580 | 5/2018 |

OTHER PUBLICATIONS

"Office Action of China Counterpart Application" with English translation thereof, dated Aug. 27, 2021, p. 1-p. 13.
"Examiner's Decision of Refusal of China Counterpart Application" with English translation thereof, dated Mar. 22, 2022, p. 1-p. 9.
Office Action of Japan Counterpart Application, with English translation thereof, dated Oct. 13, 2020, pp. 1-5.
"Office Action of China Counterpart Application", dated Dec. 25, 2020, with partial English translation thereof, pp. 1-11.
"Search Report of Europe Counterpart Application", dated Nov. 3, 2020, p. 1-p. 10.
"International Search Report (Form PCT/ISA/210) of PCT/JP2018/030315," dated Oct. 23, 2018, with English translation thereof, pp. 1-5.
"Written Opinion of the International Searching Authority (Form PCT/ISA/237) of PCT/JP2018/030315," dated Oct. 23, 2018, with English translation thereof, pp. 1-11.
"Office Action of China Counterpart Application", dated Dec. 24, 2021, with English translation thereof, p. 1-p. 12.
"Office Action of China Counterpart Application" with English translation thereof, dated Jun. 3, 2021, p. 1-p. 10.

2pt

3pt

4pt

5pt

2mm

IMAGE FORMING METHOD AND INK SET

CROSS-REFERENCE TO RELATED APPLICATIONS

This application is a continuation application of International Application No. PCT/JP2018/030315, filed Aug. 14, 2018, which is incorporated herein by reference. Further, this application claims priority from Japanese Patent Application No. 2017-190329, filed Sep. 29, 2017, which is incorporated herein by reference.

BACKGROUND OF THE INVENTION

1. Field of the Invention

The present disclosure relates to an image forming method and an ink set.

2. Description of the Related Art

A technique of applying a liquid containing an aggregating agent (also referred to as a "reactant") that aggregates components in an ink onto a base material, applying the ink, and applying a liquid containing a resin thereonto has been known.

For example, as a recording method that enables recording of a recorded image with an excellent image quality and excellent durability on a low-ink-absorbing or non-ink-absorbing recording medium, JP2016-196177A discloses a recording method including a reaction solution adhesion step of adhering a reaction solution that contains a reactant aggregating or thickening a colored ink composition to a recording area of a recording medium; a colored ink composition adhesion step of adhering the colored ink composition that contains a resin and a coloring material to the recording area to which the reaction solution has been adhered; and a clear ink composition adhesion step of adhering a clear ink composition that contains a resin, in which a resin in which the content of a 0.085 mol/kg aqueous solution of calcium acetate required for aggregating 3 mL of water containing 1% by mass of a resin is 7 mL or less is contained in the colored ink composition, as the resin contained in the colored ink composition.

As an ink jet recording method which enables stable recording of an image with an excellent fixing property to a recording medium and suppressed printing unevenness, JP2016-179675A discloses an ink jet recording method including a reaction solution adhesion step of adhering a reaction solution that contains a reactant aggregating or thickening components of a colored ink containing a coloring material to a recording medium; a colored ink adhesion step of adhering the colored ink to a region to which the reaction solution has been adhered according to an ink jet method in a state in which the residual ratio of volatile components in the reaction solution adhered to the recording medium after the reaction solution adhesion step is 25% by mass or greater; and a clear ink adhesion step of adhering a clear ink that contains a resin to the region to which the colored ink has been adhered.

As an image forming method which enables improvement of the image density using recording media on which a pretreatment of aggregating a pigment has been performed, improvement of the fixing property (abrasion resistance) without being affected by the pretreatment, and impartment of gloss, JP2016-126707A discloses an image forming method including an image forming step of adhering an ink jet ink that contains a pigment onto a surface of recording media having a pigment aggregating function to form an image; and a post-treatment step of adhering a post-treatment liquid that contains water and resin particles onto the surface of the recording media to which the ink jet ink has been adhered, in which the ink jet ink does not contain an anionic surfactant, the pKa of the resin particles is 7.0 or less, and the post-treatment liquid contains an anionic fluorine-based surfactant.

SUMMARY OF THE INVENTION

An aggregating agent (for example, the "reactant" described in JP2016-196177A or JP2016-179675A) that aggregates component in an ink plays a role of improving the image quality of an image to be formed by aggregating the components in the ink on a base material.

Therefore, according to an image forming method including a step of applying an aggregating liquid onto an impermeable base material; a step of applying an ink to at least a portion of a region in the impermeable base material to which the aggregating liquid has been applied according to an ink jet method to form an image; and a step of applying an overcoat liquid onto the region to which the aggregating liquid has been applied, in the impermeable base material on which the image has been formed to form an overcoat layer, an image with an excellent image quality can be formed, and an overcoat layer covering at least the image can be formed.

However, it was found that in a case where the image forming method including the step of forming the overcoat layer and the like is performed according to the technique described in JP2016-196177A, JP2016-179675A, or JP2016-120670A, the overcoat layer is transferred to another object in some cases. For example, it was found that in a case where a roll is formed by winding up the impermeable base material with the front surface (that is, the surface on which the image is formed, the same applies hereinafter) on which the image and the overcoat layer have been formed, the overcoat layer is transferred to the rear surface (that is, the surface opposite to the front surface, the same applies hereinafter) of the impermeable base material in contact with the overcoat layer in some cases.

The reason why the overcoat layer is transferred to another object is not clear, but the fact that the aggregating agent has a property of being easily transferred to another object and the fact that the aggregating agent is likely to remain on the surface of the base material by using the impermeable base material as the base material are considered to be related to the above-described reason. Specifically, the aggregating agent having such a property permeates into the image disposed on the aggregating agent and the overcoat layer on this image, and the overcoat layer is likely to become sticky due to the permeation. As the result, the overcoat layer tends to be transferred to another object.

Further, in a case where an image is formed by applying an ink according to an ink jet method, the jetting stability (hereinafter, also referred to as the "jetting stability of the ink") is required at the time of jetting the ink from a nozzle of an ink jet head.

An object according to an aspect of the present disclosure is to provide an image forming method which enables formation of an image with an excellent image quality and an overcoat layer that is unlikely to be transferred to another object and in which an ink during the formation of the image has excellent jetting stability.

An object according to another aspect of the present disclosure is to provide an ink jet which enables formation of an image with an excellent image quality and an overcoat layer that is unlikely to be transferred to another object and in which an ink during the formation of the image has excellent jetting stability.

Specific means for solving the above-described problems includes the following aspects.

<1> An image forming method comprising: a step of preparing an ink which contains a coloring material, water, and an organic solvent A having a vapor pressure of 0.20 kPa or less at 20° C. and in which a content of the organic solvent A is 10% by mass or greater with respect to a total amount of the ink; a step of preparing an aggregating liquid which contains an aggregating agent aggregating components in the ink and water; a step of preparing an overcoat liquid which contains a resin and an organic solvent B having a vapor pressure of 2.50 kPa or greater at 20° C. and in which a content of the organic solvent B is 10% by mass or greater with respect to a total amount of the overcoat liquid; a step of applying the aggregating liquid onto an impermeable base material; a step of applying the ink to at least a portion of a region in the impermeable base material to which the aggregating liquid has been applied according to an ink jet method to form an image; and a step of applying the overcoat liquid onto the region to which the aggregating liquid has been applied in the impermeable base material, on which the image has been formed, to form an overcoat layer.

<2> The image forming method according to <1>, in which at least one of the organic solvents A contained in the ink has a vapor pressure of 0.10 kPa or less at 20° C.

<3> The image forming method according to <1> or <2>, in which the content of the organic solvent B is 25% by mass or greater with respect to the total amount of the overcoat liquid.

<4> The image forming method according to any one of <1> to <3>, in which in the overcoat liquid, a content of an organic solvent in the overcoat liquid, which has a vapor pressure of 0.10 kPa or less at 20° C., is 10% by mass or less with respect to the total amount of the overcoat liquid.

<5> The image forming method according to any one of <1> to <4>, in which in a case where a unit of an SP value is set as $MPa^{1/2}$, an average SP value of the organic solvents A contained in the ink is set as $I_{SP}$, and an average SP value of all liquid components contained in the overcoat liquid is set as $O_{SP}$, an expression of $I_{SP}-O_{SP} \geq 3$ is satisfied.

<6> The image forming method according to any one of <1> to <5>, in which the aggregating liquid contains resin particles.

<7> The image forming method according to any one of <1> to <6>, in which the overcoat liquid contains inorganic particles.

<8> The image forming method according to <7>, in which at least one kind of the inorganic particles contained in the overcoat liquid has a Mohs hardness of 4 or greater.

<9> The image forming method according to any one of <1> to <8>, in which the impermeable base material is a resin base material.

<10> The image forming method according to any one of <1> to <9>, in which a content of the water in the overcoat liquid is 20% by mass or less with respect to the total amount of the overcoat liquid.

<11> The image forming method according to any one of <1> to <10>, in which the aggregating agent is at least one selected from the group consisting of a polyvalent metal compound, an organic acid or a salt thereof, and a metal complex.

<12> The image forming method according to any one of <1> to <11>, in which a ratio of a mass of the aggregating liquid to be applied per unit area to a mass of the overcoat liquid to be applied per unit area is 1.0 or greater.

<13> An ink set comprising: an ink which contains a coloring material, water, and an organic solvent A having a vapor pressure of 0.20 kPa or less at 20° C. and in which a content of the organic solvent A is 10% by mass or greater with respect to a total amount of the ink; an aggregating agent which aggregates components in the ink and an aggregating liquid containing water; and an overcoat liquid which contains a resin and an organic solvent B having a vapor pressure of 2.50 kPa or greater at 20° C. and in which a content of the organic solvent B is 10% by mass or greater with respect to the total amount of the overcoat liquid.

According to an aspect of the present disclosure, it is possible to provide an image forming method which enables formation of an image with an excellent image quality and an overcoat layer that is unlikely to be transferred to another object and in which an ink during the formation of the image has excellent jetting stability.

According to another aspect of the present disclosure, it is possible to provide an ink jet which enables formation of an image with an excellent image quality and an overcoat layer that is unlikely to be transferred to another object and in which an ink during the formation of the image has excellent jetting stability.

DESCRIPTION OF THE PREFERRED EMBODIMENTS

Figure 1:
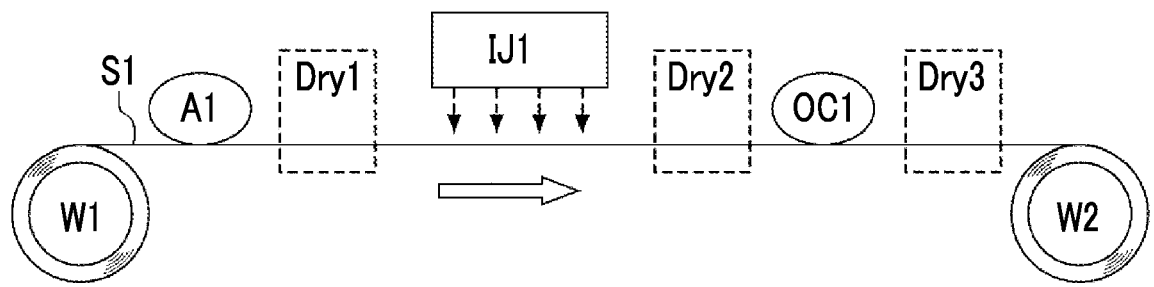
FIG. 1 is a configuration view schematically illustrating an example of an image forming device suitable for an image forming method according to an embodiment of the present disclosure.

The numerical ranges shown using "to" in the present specification indicate ranges including the numerical values described before and after "to" as the lower limits and the upper limits.

In the present specification, in a case where a plurality of substances corresponding to respective components in a composition are present, the amount of the respective components in the composition indicates the total amount of the plurality of substances present in the composition unless otherwise specified.

In the present specification, the meaning of the term "step" includes not only an independent step but also a step whose intended purpose is achieved even in a case where the step is not clearly distinguished from other steps.

In the present specification, "(meth)acryl" indicates at least one of acryl or methacryl, and "(meth)acrylate" indicates at least one of acrylate or methacrylate.

In the present specification, a combination of two or more preferable aspects is a more preferable aspect.

Image Forming Method

An image forming method according to an embodiment of the present disclosure includes a step of preparing an ink which contains a coloring material, water, and an organic solvent A having a vapor pressure of 0.20 kPa or less at 20°

C. (hereinafter, also referred to as the "vapor pressure at 20° C.") and in which a content of the organic solvent A is 10% by mass or greater with respect to a total amount of the ink; a step of preparing an aggregating liquid which contains an aggregating agent aggregating components in the ink and water; a step of preparing an overcoat liquid which contains a resin and an organic solvent B having a vapor pressure of 2.50 kPa or greater at 20° C. and in which a content of the organic solvent B is 10% by mass or greater with respect to the total amount of the overcoat liquid; a step of applying the aggregating liquid onto an impermeable base material; a step of applying the ink to at least a portion of a region in the impermeable base material to which the aggregating liquid has been applied according to an ink jet method to form an image; and a step of applying the overcoat liquid onto the region to which the aggregating liquid has been applied in the impermeable base material, on which the image has been formed to form an overcoat layer.

The image forming method according to the present embodiment may include other steps as necessary.

According to the image forming method of the present embodiment, it is possible to form an image with an excellent image quality and an overcoat layer that is unlikely to be transferred to another object. Further, according to the image forming method of the present embodiment, the ink has excellent jetting stability during the formation of an image.

The reason why the above-described effects are obtained is not clear, but is assumed as follows.

The reason why an image with an excellent image quality can be formed is considered that the image is formed by applying the ink to at least a portion of the region to which the aggregating liquid has been applied so that the components in the ink are aggregated to form the image.

The reason why the ink has excellent jetting stability is considered that the ink contains 10% by mass or greater of the organic solvents A having a vapor pressure of 0.20 kPa or less at 20° C. with respect to the total amount of the ink so that volatilization of the organic solvent A from the ink in a nozzle of an ink jet head and jetting failure (such as non-jetting) of the ink due to the volatilization are suppressed.

The reason why an overcoat layer which is unlikely to be transferred to another object can be formed is considered that the overcoat liquid for forming an overcoat layer contains 10% by mass or greater of the organic solvents B having a vapor pressure of 2.50 kPa or greater at 20° C. with respect to the total amount of the overcoat liquid so that the organic solvents B can be rapidly volatilized (that is, the drying property of the overcoat liquid can be improved) after the application of the overcoat liquid, and thus the overcoat layer with suppressed stickiness can be formed.

The stickiness of the overcoat layer here is a phenomenon unique to the image forming method carried out using an impermeable base material and an aggregating agent, and this phenomenon occurs due to the permeation of the aggregating agent into the image and the overcoat layer.

As described above, according to the image forming method of the present embodiment, since an image with an excellent image quality and an overcoat layer which is unlikely to be transferred to another object can be formed and the ink has excellent jetting stability during the formation of the image, it is possible to improve the productivity of a printed material and the image quality of the printed material (that is, the impermeable base material on which the image and the overcoat layer have been formed, the same applies hereinafter).

Hereinafter, each step in the image forming method according to the present embodiment will be described.

<Step of Preparing Ink>

The step of preparing an ink (hereinafter, also referred to as an "ink preparation step") is not particularly limited to the step of producing an ink, but may be a step of only simply preparing the ink which has been produced in advance for the image forming method according to the present embodiment.

In the ink preparation step, only one ink (that is, only an ink with one color) may be prepared or two or more inks (for example, inks with two or more colors may be prepared) may be prepared.

In a case where inks with two or more colors are prepared in the ink preparation step and the inks with two or more colors are applied to at least a portion of a region in the impermeable base material to which the aggregating liquid has been applied in an image forming step described below, images with two or more colors can be formed.

The ink contains a coloring material, water, and organic solvents A having a vapor pressure of 0.20 kPa or less at 20° C., and the content of the organic solvents A is 10% by mass or greater with respect to the total amount of the ink.

(Coloring Material)

The ink contains at least one coloring material.

The coloring material is not particularly limited and any known coloring material in the field of the ink jet ink can be used, but an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable. Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the coloring material include the colorants described in paragraphs 0096 to 0100 of JP2009-241586A.

The content of the coloring material (the total content of coloring materials in a case where two or more coloring materials are used) is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant for dispersing the coloring material. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a coloring material (p) and a dispersant (s) (p:s) is preferably in a range of 1:0.06 to 1:3, more preferably in a range of 1:0.125 to 1:2, and still more preferably in a range of 1:0.125 to 1:1.5.

(Water)

The ink contains water.

The content of water is preferably 50% by mass or greater and more preferably 60% by mass or greater with respect to the total amount of the ink.

The upper limit of the content of water is appropriately determined according to the content of components other than the water.

The upper limit of the content of water may be, for example, 89% by mass, 85% by mass, or 80% by mass.

(Organic Solvent A)

The ink contains at least one organic solvent A having a vapor pressure of 0.20 kPa or less at 20° C. The content of the organic solvent A (the total content of the organic solvents A in a case where two or more organic solvents are used) is 10% by mass or greater with respect to the total amount of the ink. In this manner, the jetting stability of the ink is improved.

The lower limit of the vapor pressure of the organic solvent A at 20° C., which has a vapor pressure of 0.20 kPa or less at 20° C., is not particularly limited, but may be, for example, 0.0001 kPa, 0.0005 kPa, or 0.001 kPa.

The content of the organic solvent A (the total content of the organic solvents A in a case where two or more organic solvents are used) is 10% by mass or greater with respect to the total amount of the ink.

From the viewpoint of improving the jetting stability of the ink, the content of the organic solvent A is more preferably 15% by mass or greater.

The upper limit of the content of the organic solvent A depends on the content of other components, but is preferably 40% by mass.

From the viewpoint of further improving the jetting stability of the ink, at least one organic solvent A contained in the ink has a vapor pressure of preferably 0.10 kPa or less (more preferably 0.05 kPa or less and still more preferably 0.03 kPa or less) at 20° C.

Further, from the viewpoint of further improving the overcoat layer, at least one organic solvent A contained in the ink has an SP value of preferably 18 $MPa^{1/2}$ or greater (more preferably in a range of 18 $MPa^{1/2}$ to 50 $MPa^{1/2}$ and still more preferably in a range of 20 $MPa^{1/2}$ to 48 $MPa^{1/2}$).

Examples of the organic solvent A include 1,2-propanediol (vapor pressure of 0.01 kPa at 20° C., SP value of 35 $MPa^{1/2}$), 1,3-propanediol (vapor pressure of 0.005 kPa at 20° C., SP value of 35 $MPa^{1/2}$; hereinafter, also referred to as "1,3-PD"), glycerin (vapor pressure of less than 0.001 kPa at 20° C., SP value of 48 $MPa^{1/2}$; hereinafter, also referred to as "GL"), propylene glycol monobutyl ether (vapor pressure of less than 0.11 kPa at 20° C., SP value of 21 $MPa^{1/2}$; hereinafter, also referred to as "PGmBE"), propylene glycol monomethyl ether (vapor pressure of less than 0.09 kPa at 20° C., SP value of 24 $MPa^{1/2}$; hereinafter, also referred to as "PGmME"), dipropylene glycol monomethyl ether (vapor pressure of 0.003 kPa at 20° C., SP value of 22 $MPa^{1/2}$), tripropylene glycol monomethyl ether (vapor pressure of less than 0.001 kPa at 20° C., SP value of 21 $MPa^{1/2}$), propylene glycol monomethyl ether acetate (vapor pressure of 0.03 kPa at 20° C., SP value of 21 $MPa^{1/2}$), dipropylene glycol monomethyl ether acetate (vapor pressure of less than 0.001 kPa at 20° C., SP value of 20 $MPa^{1/2}$), propylene glycol monopropyl ether (vapor pressure of 0.02 kPa at 20° C., SP value of 23 $MPa^{1/2}$; hereinafter, also referred to as "PGmPE"), dipropylene glycol monopropyl ether (vapor pressure of less than 0.001 kPa at 20° C., SP value of 22 $MPa^{1/2}$), dipropylene glycol monobutyl ether (vapor pressure of less than 0.001 kPa at 20° C., SP value of 21 $MPa^{1/2}$), tripropylene glycol monobutyl ether (vapor pressure of less than 0.001 kPa at 20° C., SP value of 20 $MPa^{1/2}$), dipropylene glycol dimethyl ether (vapor pressure of less than 0.005 kPa at 20° C., SP value of 22 $MPa^{1/2}$), diethylene glycol monoethyl ether (vapor pressure of less than 0.001 kPa at 20° C., SP value of 23 $MPa^{1/2}$), diethylene glycol monomethyl ether (vapor pressure of 0.002 kPa at 20° C., SP value of 24 $MPa^{1/2}$), diethylene glycol monobutyl ether (vapor pressure of less than 0.001 kPa at 20° C., SP value of 22 $MPa^{1/2}$), diethylene glycol monohexyl ether (vapor pressure of less than 0.001 kPa at 20° C., SP value of 21 $MPa^{1/2}$), ethylene glycol monopropyl ether (vapor pressure of 0.02 kPa at 20° C., SP value of 23 $MPa^{1/2}$; hereinafter, also referred to as "EGmPE"), ethylene glycol monobutyl ether (vapor pressure of 0.007 kPa at 20° C., SP value of 22 $MPa^{1/2}$), ethylene glycol monohexyl ether (vapor pressure of less than 0.001 kPa at 20° C., SP value of 21 $MPa^{1/2}$), triethylene glycol monomethyl ether (vapor pressure of less than 0.001 kPa at 20° C., SP value of 23 $MPa^{1/2}$), triethylene glycol monoethyl ether (vapor pressure of less than 0.001 kPa at 20° C., SP value of 22 $MPa^{1/2}$), triethylene glycol monobutyl ether (vapor pressure of less than 0.001 kPa at 20° C., SP value of 22 $MPa^{1/2}$), 1,2-hexanediol (vapor pressure of 0.002 kPa at 20° C., SP value of 30 $MPa^{1/2}$), 1,4-butanediol (vapor pressure of 0.001 kPa at 20° C., SP value of 31 $MPa^{1/2}$), 1,2-butanediol (vapor pressure of 0.003 kPa at 20° C., SP value of 31 $MPa^{1/2}$), 2-pyrrolidone (vapor pressure of less than 0.001 kPa at 20° C., SP value of 29 $MPa^{1/2}$), and γ-butyrolactone (vapor pressure of less than 0.004 kPa at 20° C., SP value of 21 $MPa^{1/2}$).

In the image forming method according to the present embodiment, in a case where the unit of the SP value is set as $MPa^{1/2}$, the average SP value of the organic solvents A contained in the ink is set as $I_{SP}$, and the average SP value of all liquid components contained in the overcoat liquid described below is set as $O_{SP}$, it is preferable that an expression of "$I_{SP} - O_{SP} \geq 3$" is satisfied.

That is, it is preferable that a difference between $I_{SP}$ related to the degree of the hydrophilicity of the organic solvents A contained in the ink and $O_{SP}$ related to the degree of the hydrophilicity of all liquid components contained in the overcoat liquid is 3 $MPa^{1/2}$ or greater. In this manner, transfer of the organic solvents A from the image formed using the ink to the overcoat layer formed on the image is suppressed, and thus stickiness and transfer of the overcoat layer are further suppressed.

Here, the reason why the average SP value of all liquid components contained in the ink is not set as ISP but the average SP value of the organic solvent A contained in the ink is set as ISP is that liquid components remaining in the image at the stage where the overcoat liquid is applied are mainly the organic solvents A.

Further, the liquid components contained in the overcoat liquid correspond to at least the organic solvents B. In a case where the overcoat liquid contains water and organic solvents other than the organic solvents B, the organic solvents other than the organic solvents B and the water also correspond to the liquid components contained in the overcoat liquid.

In the image forming method according to the present embodiment, it is more preferable that an expression of "$I_{SP} - O_{SP} \geq 5$" is satisfied and still more preferable that an expression of "$I_{SP} - O_{SP} \geq 10$" is satisfied.

Here, the average SP value of the organic solvents A contained in the ink indicates the weighted average value of the SP values of respective organic solvents A contained in the ink, and the average SP values of all liquid components contained in the overcoat liquid indicates the weighted average value of the SP values of respective liquids contained in the overcoat liquid.

The SP value in the present disclosure is calculated according to the Okitsu method ("Journal of the Adhesion Society of Japan" 29 (5) (1993), written by Toshinao Okitsu).

Specifically, the SP value is calculated according to the following equation. Further, ΔF is a value described in the document.

SP value (δ)=ΣΔF (Molar Attraction Constants)/V (molar volume)

Further, the unit of the SP value in the present specification is $MPa^{1/2}$.

Further, the weighted average value of the SP values is "X" acquired by Equation 1 shown below.

Specifically, the average SP value ($I_{SP}$) of the organic solvents A contained in the ink is X calculated by substituting the SP value of the i-th (i represents an integer of 1 or greater) organic solvent A contained in the ink for $S_i$ and substituting the mass fraction of the i-th organic solvent A in all organic solvents A contained in the ink for $W_i$.

Further, the average SP value ($O_{SP}$) of all liquid components contained in the overcoat liquid is X calculated by substituting the SP value of the i-th (i represents an integer of 1 or greater) liquid component contained in the overcoat liquid for $S_i$ and substituting the mass fraction of the i-th liquid component in all liquid components contained in the overcoat liquid for $W_i$.

$$X = \frac{\sum S_i W_i}{\sum W_i} \quad \text{(Equation 1)}$$

The upper liquid of $I_{SP}-O_{SP}$ is not particularly limited, and $I_{SP}-O_{SP}$ is, for example, 25 $MPa^{1/2}$ or less and preferably 20 $MPa^{1/2}$ or less.

The value of $I_{SP}$ is not particularly limited, and ISP is preferably in a range of 20 $MPa^{1/2}$ to 45 $MPa^{1/2}$.

The value of $O_{SP}$ is not particularly limited, and $O_{SP}$ is preferably in a range of 15 $MPa^{1/2}$ to 40 $MPa^{1/2}$.

The ink may contain an organic solvent other than the above-described organic solvents A as long as the conditions of the present embodiment are satisfied.

The proportion of the organic solvents A in all organic solvents in the ink is preferably in a range of 50% by mass to 100% by mass, more preferably in a range of 60% by mass to 100% by mass, and still more preferably in a range of 80% by mass to 100% by mass.

(Resin Particles)

The ink may contain at least one kind of resin particles.

In a case where the ink contains resin particles, the fixing property of mainly the ink to the impermeable base material and the rub resistance can be improved. Further, the resin particles have a function of fixing the ink, that is, the image by being unstably aggregated or dispersed at the time of being contact with the aggregating agent described below and thickening the ink. It is preferable that such resin particles are dispersed in water and a water-containing organic solvent.

Examples of the resin particles include the resin particles (for example, self-dispersing polymer particles) described in paragraphs 0062 to 0076 of JP2016-188345A.

(Other Components)

The ink may contain components other than the above-described components.

Examples of other components include known additives such as an anti-drying agent (wetting agent), a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

<Step of Preparing Aggregating Liquid>

The step of preparing an aggregating liquid (hereinafter, also referred to as an "aggregating liquid preparation step") is not particularly limited to the step of producing an aggregating liquid, but may be a step of only simply preparing the aggregating liquid which has been produced in advance for the image forming method according to the present embodiment.

The aggregating liquid contains water and an aggregating agent that aggregates components in the ink.

(Aggregating Agent)

The aggregating liquid contains at least one aggregating agent that aggregates components in the ink.

The aggregating agent has a function of aggregating the components (for example, a coloring material and resin particles in a case where the ink contains resin particles) in the ink on the impermeable base material so that the image quality of an image to be formed by the ink is improved.

Further, the aggregating liquid contributes to increasing the speed of image formation.

The aggregating agent is not particularly limited as long as the aggregating agent has the above-described function.

As the aggregating agent, at least one selected from the group consisting of a polyvalent metal compound, an organic acid or a salt thereof, and a metal complex is exemplified.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium). Suitable examples of salts of these metals include a nitrate, a chloride, and a thiocyanate.

Among examples, a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the aggregating liquid.

—Organic Acid or Salt Thereof—

As the organic acid, an organic compound containing an acidic group is exemplified.

Examples of the acidic group include a phosphoric acid group, a phosphonic acid group, a phosphinic acid group, a sulfate group, a sulfo group, a sulfinic acid group, and a carboxy group. From the viewpoint of the aggregation rate of the ink, a phosphoric acid group or a carboxy group is preferable, and a carboxy group is more preferable as the acidic group.

Further, it is preferable that at least a part of the acidic group is dissociated in the aggregating liquid.

Preferred examples of the organic compound containing a carboxy group include polyacrylic acid, acetic acid, glycolic acid, malonic acid, malic acid (preferably DL-malic acid), maleic acid, ascorbic acid, succinic acid, glutaric acid, pimelic acid, adipic acid, fumaric acid, citric acid, tartaric acid, phthalic acid, 4-methylphthalic acid, lactic acid, sulfonic acid, orthophosphoric acid, pyrrolidone carboxylic acid, pyrrone carboxylic acid, pyrrole carboxylic acid, furan carboxylic acid, pyridine carboxylic acid, coumarinic acid, thiophene carboxylic acid, nicotinic acid, derivatives of these compounds, and salts of these. These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

As the polyvalent carboxylic acid, malonic acid, malic acid, maleic acid, succinic acid, glutaric acid, fumaric acid, tartaric acid, 4-methylphthalic acid, or citric acid is preferable, and malonic acid, malic acid, tartaric acid, or citric acid is more preferable.

It is preferable that the pKa of the organic acid is low.

In this manner, the surface charge of particles (such as the pigment or the resin particles) stably dispersed in the ink by a weakly acidic functional group such as a carboxy group is reduced by bringing the ink into contact with an organic acidic compound having a lower pKa to degrade the dispersion stability.

It is preferable that the organic acid contained in the aggregating liquid is a compound which has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, various metal complexes are commercially available, and a commercially available metal complex may be used in the present embodiment. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Pharmaceutical Manufacture Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and ORGATIX ZC-126 (manufactured by Matsumoto Fine Chemical Co., Ltd.). Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and ORGATIX ZC-126 (manufactured by Matsumoto Fine Chemical Co., Ltd.) are preferable.

—Cationic Polymer—

As the aggregating agent, a combination of a cationic polymer described in JP2016-188345A with at least one selected from the group consisting of a polyvalent metal compound, an organic acid or a salt thereof, and a metal complex.

The content of the aggregating agent is not particularly limited, but is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the aggregating liquid from the viewpoint of the aggregation rate of the ink.

(Water)

The aggregating liquid contains water. The content of water is preferably in a range of 50% by mass to 90% by mass and more preferably in a range of 60% by mass to 80% by mass with respect to the total amount of the aggregating liquid.

(Resin Particles)

It is preferable that the aggregating liquid may contain at least one kind of resin particles.

In a case where the aggregating liquid contains resin particles, the adhesiveness between the image and the impermeable base material is further improved.

The resin particles may contain only one kind of resin or a plurality of resins.

Further, it is preferable that the resin contained in the resin particles is a water-insoluble resin.

In the present specification, the term "water-insoluble" indicates a property in which the amount of a substance to be dissolved in 100 g of water at 25° C. is less than 1.0 g (more preferably less than 0.5 g).

The resin contained in the resin particles is not particularly limited, and examples thereof include a polyurethane resin, a polyamide resin, a polyurea resin, a polycarbonate resin, a polyolefin resin, a polystyrene resin, a polyester resin, and an acrylic resin.

From the viewpoint of improving the adhesiveness between the image and the impermeable base material, as the resin particles, at least one kind selected from the group consisting of polyurethane resin particles, polyamide resin particles, polyurea resin particles, polycarbonate resin particles, polyolefin resin particles, polystyrene resin particles, polyester resin particles, and (meth)acrylic resin particles is preferable, and at least one kind selected from the group consisting of polyester resin particles and polyamide resin particles is more preferable.

—Alicyclic Structure or Aromatic Ring Structure—

It is preferable that the resin contained in the resin particles has an alicyclic structure or an aromatic ring structure and more preferable that the resin has an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, but is preferably in a range of 0.01 mol to 1.5 mol and more preferably in a range of 0.1 mol to 1 mol per 100 g of the resin contained in the resin particles.

—Ionic Group—

It is preferable that the resin contained in the resin particles has an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, but is preferably in a range of 0.001 mol to 1.0 mol and more preferably in a range of 0.01 mol to 0.5 mol per 100 g of the resin contained in the resin particles.

—Volume Average Particle Diameter—

The volume average particle diameter of the resin particles is preferably in a range of 1 nm to 300 rim, more preferably in a range of 3 nm to 200 m̄n, and still more preferably in a range of 5 inn to 150 rim.

In the present disclosure, the volume average particle diameter is a value measured using a laser diffraction scattering particle size distribution analyzer.

As a measuring device, a particle size distribution measuring device "MICROTRAC MT-3300II" (manufactured by Nikkiso Co., Ltd.) is exemplified.

—Weight-Average Molecular Weight—

The weight-average molecular weight (Mw) of the resin contained in the resin particles is preferably in a range of 1000 to 300000, more preferably in a range of 2000 to 200000, and still more preferably in a range of 5000 to 100000.

In the present disclosure, the weight-average molecular weight (Mw) is measured according to gel permeation chromatography (GPC) unless otherwise specified.

The measurement according to GPC is performed using HLC (registered trademark)-8020GPC (manufactured by Tosho Corporation) as a measuring device, three columns of TSKgel (registered trademark) Super Multipore HZ-H (manufactured by Tosho Corporation, 4.6 mmID×15 cm), and tetrahydrofuran (THF) as an eluent. Further, as the measurement conditions, the measurement is performed at a sample concentration of 0.45% by mass, a flow rate of 0.35 ml/min, a sample injection volume of 10 μL, and a measurement temperature of 40° C. using a refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by TOSOH CORPORATION).

Specific examples of the resin particles include PES-RESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

In a case where the aggregating liquid contains the resin particles, the content of the resin particles is preferably in a range of 1% by mass to 25% by mass, more preferably in a range of 2% by mass to 20% by mass, and still more preferably in a range of 3% by mass to 15% by mass with respect to the total amount of the aggregating liquid.

In a case where the aggregating liquid contains the resin particles, the content mass ratio of the resin particles to the aggregating agent (that is, the ratio [content mass of resin particles/content mass of aggregating agent]) is preferably in a range of 1 to 10, more preferably in a range of 1 to 8, and still more preferably in a range of 1 to 5.

(Water-Soluble Polymer Compound)

The aggregating liquid may contain a water-soluble polymer compound.

The water-soluble polymer compound is not particularly limited, and known water-soluble polymer compounds such as polyvinyl alcohol, polyacrylamide, polyvinylpyrrolidone, and polyethylene glycol can be used.

Further, water-soluble polymer compounds described in paragraphs 0026 to 0080 of JP2013-001854A are also suitable as the water-soluble polymer compound.

(Water-Soluble Organic Solvent)

It is preferable that the aggregating liquid contains at least one water-soluble organic solvent.

In the present specification, the term "water-soluble" indicates a property in which 3 g or greater (more preferably 10 g or greater) of a substance is dissolved in 100 g of water at 25° C.

As the water-soluble organic solvent, known solvents can be used without particular limitation.

Examples of the water-soluble organic solvent include glycols such as glycerin, 1,2,6-hexanetriol, trimethylolpropane, ethylene glycol, propylene glycol (that is, 1,2-propanediol), triethylene glycol (that is, 1,3-propanediol), diethylene glycol, triethylene glycol, tetraethylene glycol, pentaethylene glycol, and dipropylene glycol; polyhydric alcohols, for example, alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among those, from the viewpoint of suppressing transfer of the component contained in the aggregating liquid, polyalkylene glycol or a derivative thereof is preferable; and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

From the viewpoint of the coating properties, the content of the water-soluble organic solvent in the aggregating liquid is preferably in a range of 3% by mass to 20% by mass and more preferably in a range of 5% by mass to 15% by mass with respect to the total amount of the aggregating agent.

From the viewpoint of the adhesiveness between the aggregating liquid and the impermeable base material, it is preferable that the aggregating liquid does not contain a water-soluble organic solvent having an SP value of 26 $MPa^{1/2}$ or less or the content of the water-soluble organic solvent having an SP value of 26 $MPa^{1/2}$ or less is greater than 0% by mass and less than 10% by mass; more preferable that the aggregating liquid does not contain a water-soluble organic solvent having an SP value of 26 $MPa^{1/2}$ or less or the content of the water-soluble organic solvent having an SP value of 26 $MPa^{1/2}$ or less is greater than 0% by mass and less than 5% by mass; still more preferable that the aggregating liquid does not contain a water-soluble organic solvent having an SP value of 26 $MPa^{1/2}$ or less or the content of the water-soluble organic solvent having an SP value of 26 $MPa^{1/2}$ or less is greater than 0% by mass and less than 2% by mass; and particularly preferable that the aggregating liquid does not contain a water-soluble organic solvent having an SP value of 26 $MPa^{1/2}$ or less.

(Surfactant)

The aggregating liquid may contain at least one surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based surfactants (fluorinated alkyl-based surfactants) and silicone-based surfactants described in JP2003-322926A, JP2004-325707A, and JP2004-309806A.

The content of the surfactant in the aggregating liquid is not particularly limited, but the content thereof can be set such that the surface tension of the aggregating liquid reaches preferably 50 mN/m or less, more preferably in a range of 20 mN/m to 50 mN/m, and still more preferably in a range of 30 mN/m to 45 mN/m.

(Other Additives)

The aggregating liquid may contain other components in addition to the above-described components as necessary.

Examples of other components which can be contained in the aggregating liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

(Physical Properties of Aggregating Liquid)

From the viewpoint of the aggregation rate of the ink, the pH of the aggregating liquid at 25° C. is preferably in a range of 0.1 to 3.5.

In a case where the pH of the aggregating liquid is 0.1 or greater, the roughness of the impermeable base material is further decreased and the adhesiveness of the image area is further improved.

In a case where the pH of the aggregating liquid is 3.5 or less, the aggregation rate is further improved, coalescence of dots (ink dots) caused by the ink on the impermeable base material is further suppressed, and the roughness of the image is further decreased.

The pH (25° C.) of the aggregating liquid is more preferably in a range of 0.2 to 2.0.

From the viewpoint of the aggregation rate of the ink, the viscosity of the aggregating liquid is preferably in a range of 0.5 mPa·s to 10 mPa·s and more preferably in a range of 1 mPa·s to 5 mPa·s. The viscosity is a value measured using a VISCOMETER TV-22 (manufactured by TOKI SANGYO CO., LTD.) under a temperature condition of 25° C.

The surface tension of the aggregating liquid at 25° C. is preferably 60 mN/m or less, more preferably in a range of 20 mN/m to 50 mN/m, and still more preferably in a range of 30 mN/n to 45 mN/m. In a case where the surface tension of the aggregating liquid is in the above-described range, the adhesiveness between the impermeable base material and the aggregating liquid is improved. The surface tension of the aggregating liquid is measured using an Automatic Surface Tensiometer CBVP-Z (manufactured by Kyowa Interface Science Co., Ltd.) according to a plate method.

<Step of Preparing Overcoat Liquid>

The step of preparing the overcoat liquid (hereinafter, also referred to as an "overcoat liquid preparation step") is not particularly limited to the step of producing an overcoat liquid, but may be a step of only simply preparing the overcoat liquid which has been produced in advance for the image forming method according to the present embodiment.

The overcoat liquid contains a resin and organic solvents B having a vapor pressure of 2.50 kPa or greater at 20° C., and the content of the organic solvents B is 10% by mass or greater with respect to the total amount of the overcoat liquid.

Organic Solvent B

The overcoat liquid contains at least one organic solvent B having a vapor pressure of 2.50 kPa or greater at 20° C. The content of the organic solvent B (the total content of the organic solvents B in a case where two or more organic solvents are used) is 10% by mass or greater with respect to the total amount of the overcoat liquid. In this manner, the stickiness of the overcoat layer is suppressed, and thus transfer of the overcoat layer to another object is suppressed.

The vapor pressure of the organic solvents B at 20° C. is more preferably 2.80 kPa or greater.

The upper limit of the organic solvents B having a vapor pressure of 2.50 kPa or greater at 20° C. is not particularly limited, but is preferably 30 kPa.

From the viewpoint of further suppressing transfer of the overcoat layer, at least one organic solvent B contained in the overcoat liquid has a vapor pressure of preferably 4.00 kPa or greater (more preferably 6.00 kPa or greater and still more preferably 8.00 kPa or greater) at 20° C.

The content of the organic solvent B (the total content of the organic solvents B in a case where two or more organic solvents are used) is 10% by mass or greater with respect to the total amount of the overcoat liquid.

From the viewpoint of further suppressing transfer of the overcoat layer, the content of the organic solvents B is more preferably 25% by mass or greater, still more preferably 35% by mass or greater, and even still more preferably 45% by mass or greater.

The upper limit of the content of the organic solvents B is determined by the relationship between the content of the organic solvents B and the content of other components, but is preferably 80% by mass.

Examples of the organic solvents B include toluene (vapor pressure of 2.90 kPa at 20° C.; hereinafter, also referred to as "TOL"), isopropyl alcohol (vapor pressure of 4.30 kPa at 20° C.; hereinafter, also referred to as "IPA"), ethyl acetate (vapor pressure of 8.70 kPa at 20° C.; hereinafter, also referred to as "EA"), acetone (vapor pressure of 24 kPa at 20° C.), methyl acetate (vapor pressure of 23 kPa at 20° C.), propyl acetate (vapor pressure of 2.5 kPa at 20° C.), tetrahydrofuran (vapor pressure of 19 kPa at 20° C.), methanol (vapor pressure of 13 kPa at 20° C.), methyl ethyl ketone (vapor pressure of 9.5 kPa at 20° C.), ethanol (vapor pressure of 5.9 kPa at 20° C.), methyl cyclohexane (vapor pressure of 6.2 kPa at 20° C.), and cyclohexane (vapor pressure of 10.3 kPa at 20° C.).

The overcoat liquid may contain an organic solvent other than the above-described organic solvents B as long as the conditions of the present embodiment are satisfied.

From the viewpoint of further suppressing transfer of the overcoat layer, the content of the organic solvents having a vapor pressure of 0.10 kPa or less at 20° C. in the overcoat liquid is preferably 10% by mass or less with respect to the total amount of the overcoat liquid.

Further, from the viewpoint of further suppressing transfer of the overcoat layer, the proportion of the organic solvents B in all organic solvents in the overcoat liquid is preferably in a range of 50% by mass to 100% by mass, more preferably in a range of 60% by mass to 100% by mass, and still more preferably in a range of 80% by mass to 100% by mass.

Further, the overcoat liquid may contain water.

From the viewpoint of further suppressing the transfer of the overcoat layer, the content of water in the overcoat liquid is preferably 30% by mass or less, more preferably 20% by mass or less, still more preferably 15% by mass or less, and even still more preferably 10% by mass or less with respect to the total amount of the overcoat liquid.

The content of water in the overcoat liquid may be 0% by mass. In other words, the overcoat liquid may not contain water.

As described above, from the viewpoint of further suppressing the transfer of the overcoat layer, the image forming method according to the present embodiment satisfies preferably an expression of "$I_{SP}-O_{SP} \geq 3$", more preferably an expression of "$I_{SP}-O_{SP} \geq 5$", and still more preferably an expression of "$I_{SP}-O_{SP} \geq 10$".

(Resin)

The overcoat liquid contains at least one resin.

The resin functions as a binder in the overcoat layer to be formed.

Examples of the resin include a polyamide resin, a polyurethane resin, a cellulose resin, a (meth)acrylic resin, a polyolefin resin, a polyester resin, a vinyl chloride resin, and a vinyl acetate resin.

The weight-average molecular weight of the resin is preferably in a range of 5000 to 100000, more preferably in a range of 10000 to 100000, and still more preferably in a range of 20000 to 80000.

The content of the resin with respect to the total amount of the overcoat liquid is not particularly limited.

The content of the resin is preferably in a range of 5% to 70% by mass, more preferably in a range of 10% to 50% by mass, and still more preferably 20% to 40% by mass with respect to the total amount of the overcoat liquid.

(Inorganic Particle)

It is preferable that the overcoat liquid contains at least one kind of inorganic particles.

In a case where the overcoat liquid contains inorganic particles, the transfer of the overcoat layer is further suppressed.

In the case where the overcoat liquid contains at least one kind of inorganic particles, at least one kind of inorganic particles contained in the overcoat liquid has a Mohs hardness of preferably 4 or greater. In this manner, the transfer of the overcoat layer is further suppressed.

The Mohs hardness of the inorganic particles is preferably 4 or greater and more preferably 5 or greater as described above.

The upper limit of the Mohs hardness of the inorganic particles is not particularly limited. The upper limit of the Mohs hardness of the inorganic particles is naturally 10 based on the definition of the Mohs hardness and preferably 9.

Here, the Mohs hardness is an index of hardness represented by a numerical value of 1 to 10.

The standard material having a Mohs hardness of 1 is talc ($Mg_3Si_4O_{10}(OH)_2$), the standard material having a Mohs hardness of 2 is gypsum ($CaSO_4.2H_2O$), the standard material having a Mohs hardness of 3 is calcite ($CaCO_3$), the standard material having a Mobs hardness of 4 is fluorite ($CaF_2$), the standard material having a Mohs hardness of 5 is apatite ($Ca_5(PO_4)_3(OH^-,Cl^-,F^-)$), the standard material having a Mohs hardness of 6 is orthoclase ($KAlSi_3O_8$), the standard material having a Mohs hardness of 7 is quartz ($SiO_2$), the standard material having a Mohs hardness of 8 is topaz ($Al_2SiO_4(OH^-,F^-)_2$), the standard material having a Mohs hardness of 9 is corundum ($Al_2O_3$), and the standard material having a Mohs hardness of 10 is diamond (C).

In a case where the overcoat liquid contains inorganic particles having a Mohs hardness of 4 or greater, the overcoat liquid may contain not only inorganic particles having a Mohs hardness of 4 or greater but also inorganic particles having a Mohs hardness of less than 4.

The proportion of the inorganic particles having a Mohs hardness of 4 or greater in the inorganic particles contained in the overcoat liquid is preferably 50% by mass to 100% by mass and more preferably in a range of 80% by mass to 100% by mass.

Examples of the inorganic particles having a Mohs hardness of 4 or greater include anatase type titanium oxide particles (Mohs hardness of 5.5 to 6.0), rutile type titanium oxide particles (Mohs hardness of 7.0 to 7.5), silica particles (Mohs hardness of 7), and alumina particles (Mohs hardness of 9).

Examples of the inorganic particles having a Mohs hardness of less than 4 include barium sulfate particles (Mohs hardness of 3.0 to 3.5).

Further, a white pigment is preferable as the inorganic particles which can be contained in the overcoat liquid.

In a case where the overcoat liquid contains a white pigment as the inorganic particles, the appearance of the image in the impermeable base material on which the image and the overcoat layer have been formed, in a case where the image is viewed from a side of the impermeable base material, is improved.

Examples of the inorganic particles serving as the white pigment include anatase type titanium oxide particles, rutile type titanium oxide particles, and barium sulfate particles.

The volume average particle diameter of the inorganic particles is preferably in a range of 0.10 µm to 2.00 µm, more preferably in a range of 0.15 µm to 1.00 µm, and still more preferably in a range of 0.20 µm to 0.50 µm.

The content of the inorganic particles with respect to the total amount of the overcoat liquid is not particularly limited.

The content of the inorganic particles is preferably in a range of 5% to 70% by mass, more preferably in a range of 10% to 50% by mass, and still more preferably in a range of 20% to 50% by mass with respect to the total amount of the overcoat liquid.

(Other Components)

The overcoat liquid may contain components other than the above-described components.

Examples of other components include known additives such as an anti-drying agent (wetting agent), a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersant, a dispersion stabilizer, a rust inhibitor, and a chelating agent.

<Step of Applying Aggregating Liquid>

The step of applying the aggregating liquid (hereinafter, also referred to as an "aggregating liquid application step") is a step of applying the aggregating liquid onto the impermeable base material.

Impermeable Base Material)

In the present specification, the "impermeable base material" indicates a base material that absorbs a small amount of water or does not absorb water. Specifically, the "impermeable base material" indicates a base material in which absorbs 0.3 $g/m^2$ or less of water.

The amount ($g/m^2$) of water to be absorbed by the base material is measured in the following manner.

Water is brought into contact with a region having a size of 100 mm×100 mm in the front surface (that is, the surface on which an image is expected to be formed) of the base material, and the state is held at 25° C. for 1 minute. The mass of water absorbed (absorption amount (g)) by holding the state for 1 minute is acquired, and the obtained absorption amount (g) is converted to the absorption amount ($g/m^2$) per unit area.

The impermeable base material is not particularly limited, and a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

The shape of the resin base material is not particularly limited, but a sheet-like resin base material is preferable. From the viewpoint of the productivity of the printed material (that is, the resin base material on which the image and the overcoat layer have been formed), a sheet-like resin base material which is capable of forming a roll by being wound is more preferable.

The thickness of the resin base material is preferably in a range of 10 μm to 200 μm and more preferably in a range of 10 μm to 100 μm.

The resin base material may have been subjected to a surface treatment.

Examples of the surface treatment include a corona treatment, a plasma treatment, a flame treatment, a heat treatment, an abrasion treatment, a light irradiation treatment (UV treatment), and a flame treatment, but the present invention is not limited thereto. For example, in a case where a corona treatment is performed on the surface of the resin base material before the ink is applied to record an image, the surface energy of the resin base material increases, and wetting of the surface of the resin base material and adhesion of the ink to the resin base material are promoted. The corona treatment can be performed using Corona Master (manufactured by Shinko Electric & Instrumentation Co., Ltd., PS-10S) or the like. The conditions for the corona treatment may be appropriately selected depending on the kind of the resin base material, the composition of the aggregating liquid, the composition of the ink, and the like. For example, the following treatment conditions may be employed.

Treatment voltage: 10 to 15.6 kV

Treatment speed: 30 to 100 mm/s

The aggregating liquid can be applied to the impermeable base material using a known method such as a coating method, an ink jet method, or an immersion method.

Examples of the coating method include known coating methods using a bar coater (for example, a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method in the image forming step described below.

The mass ($g/m^2$) of the aggregating liquid to be applied per unit area is not particularly limited as long as the components in the ink can be aggregated, but is preferably in a range of 0.1 $g/m^2$ to 10 $g/m^2$, more preferably in a range of 0.5 $g/m^2$ to 6.0 $g/m^2$, and still more preferably in a range of 1.0 $g/m^2$ to 4.0 $g/m^2$.

In the aggregating liquid application step, the impermeable base material may be heated before the application of the aggregating liquid.

The heating temperature may be appropriately set depending on the kind of the impermeable base material and the composition of the aggregating liquid, but the temperature of the impermeable base material is preferably in a range of 20° C. to 50° C. and more preferably in a range of 25° C. to 40° C.

In the aggregating liquid application step, the aggregating liquid may be heated and dried after the application of the aggregating liquid and before the image forming step described below.

Examples of the means for performing heating and drying the image include known heating means such as a heater, known air blowing means such as a dryer, and means for combining these.

Examples of the method for performing heating and drying the image include a method of applying heat from a side opposite to the surface of the impermeable base material, to which the aggregating liquid has been applied, using a heater or the like; a method of applying warm air or hot air to the surface of the impermeable base material to which the aggregating liquid has been applied; a method of applying heat from the surface of the impermeable base material to which the aggregating liquid has been applied or from a side opposite to the surface of the impermeable base material, to which the aggregating liquid has been applied, using an infrared heater; and a method of combining a plurality of these methods.

The heating temperature at the time of heating and drying the image is preferably 35° C. or higher and more preferably 40° C. or higher.

The upper limit of the heating temperature is not particularly limited, and the upper limit thereof may be, for example, 100° C., preferably 90° C., and more preferably 70° C.

The time of heating and drying the image is not particularly limited, but is preferably in a range of 0.5 seconds to 60 seconds, more preferably in a range of 0.5 seconds to 20 seconds, and particularly preferably in a range of 0.5 seconds to 10 seconds.

<Step of Forming Image>

The step of forming an image (hereinafter, also referred to as an "image forming step") is a step of forming an image by applying the ink to at least a portion of a region in the impermeable base material to which the aggregating liquid has been applied according to an ink jet method.

In the present step, the ink can be selectively applied onto the impermeable base material, and thus an image having a desired shape (specifically, a visible image) can be fanned.

In the present step, the ink may be applied to the entire region to which the aggregating liquid has been applied to form an image on the entire region, or the ink may be applied to a portion of the region to which the aggregating liquid has been applied to form an image on the portion. In a case where the image is formed on the portion, the image and a non-image forming region (that is, a region where the ink has not been applied) are formed on the region to which the aggregating liquid has been applied.

In the image forming step, only one ink may be applied to at least a portion of the region in the impermeable base material to which the aggregating liquid has been applied to form an image, or two or more kinds of inks may be applied thereto to form an image. In the image fanning step, an image with two or more colors can be fanned in a case where two or more colors of inks have been applied.

The ink jetting system in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet system of jetting an ink using a radiation pressure by changing an electric signal into an acoustic beam and radiating the acoustic beam to the ink; and a thermal ink jet (bubble jet (registered trademark)) method of heating an ink to form bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, the method described in paragraphs 0093 to 0105 of JP2003-306623A can also be applied as the ink jet method.

The ink is applied to the region of the impermeable base material to which the aggregating liquid has been applied according to the ink jet method by jetting the ink from a nozzle of an ink jet head.

As a system of the ink jet head, there are two systems for the ink jet head, which are a shuttle system of performing recording while scanning a short serial head in the width direction of the impermeable base material and a line system of using a line head in which recording elements are aligned in correspondence with the entire area of one side of the impermeable base material.

In the line system, image formation can be performed on the entire surface of the impermeable base material by scanning the impermeable base material in a direction intersecting the direction in which the recording elements are aligned. Therefore, in the line system, a transport system such as a carriage that scans a short head in the shuttle system becomes unnecessary. Further, in the line system, since movement of a carriage and complicated scanning control between the head and the impermeable base material become unnecessary and only the impermeable base material moves, compared to the shuttle system. Therefore, according to the line system, an increase in speed of the image formation can be realized, compared to the shuttle system.

From the viewpoint of obtaining an image with high definition, the liquid droplet amount of ink jetted from a nozzle of the ink jet head is preferably in a range of 1 pL (pico liter) to 10 pL and more preferably in a range of 1.5 pL to 6 pL.

In addition, from the viewpoints of improving the image irregularity and improving connection of continuous gradations, it is also effective that the ink is jetted by combining different amounts of liquid droplets.

In the image forming step, an image is formed by applying the ink to the region in the impermeable base material to which the aggregating liquid has been applied and heating and drying the applied ink.

Examples of the means for performing heating and drying the image include known heating means such as a heater, known air blowing means such as a dryer, and means for combining these.

Examples of the method for performing heating and drying the ink include a method of applying heat from a side of the impermeable base material opposite to a surface to which the ink has been applied using a heater or the like, a method of applying warm air or hot air to a surface of the impermeable base material to which the ink has been applied, a method of applying heat from a surface of the impermeable base material to which the ink has been applied or from a side of the impermeable base material opposite to a surface to which the ink has been applied using an infrared heater, and a method of combining a plurality of these methods.

The heating temperature at the time of heating and drying the ink is preferably 55° C. or higher, more preferably 60° C. or higher, and particularly preferably 65° C. or higher.

The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

In the image forming step, the impermeable base material (specifically, the impermeable base material to which the aggregating liquid has been applied in the aggregating liquid application step) may be heated before the application of the ink.

The heating temperature may be appropriately set depending on the kind of the impermeable base material and the composition of the ink, but the temperature of the impermeable base material is preferably in a range of 20° C. to 50° C. and more preferably in a range of 25° C. to 40° C.

In a case where the aggregating liquid is heated and dried in the aggregating liquid application step, the impermeable base material before the application of the ink may be heated through the heating for heating and drying the aggregating liquid.

<Step of Forming Overcoat Layer>

The step of forming an overcoat layer (hereinafter, also referred to as an "overcoat layer forming step") is a step of forming an overcoat layer by applying the overcoat liquid onto the region to which the aggregating liquid has been applied, in the impermeable base material on which an image has been formed.

Here, the expression of "onto the region to which the aggregating liquid has been applied, in the impermeable base material on which an image has been formed" indicates onto the image in a case where the image is formed on the entire region to which the aggregating liquid has been applied in the above described image forming step and indicates onto the image and onto the non-image forming region in a case where the image and the non-image forming region are formed on the region to which the aggregating liquid has been applied in the above-described image forming step.

In the overcoat layer forming step, an overcoat layer covering at least the image is formed.

Specifically, in the case where the image is formed on the entire region to which the aggregating liquid has been applied in the above-described image forming step, an overcoat layer covering the image is formed in the overcoat layer forming step. In the case where the image and the non-image forming region are formed on the region to which the aggregating liquid has been applied in above-described the ink application step, an overcoat layer covering the image and the non-image forming region is formed in the overcoat layer forming step.

The overcoat liquid can be applied onto the region to which the aggregating liquid has been applied, in the impermeable base material on which an image has been formed according to a known method such as a coating method, an ink jet method, or an immersion method.

Examples of the coating method include known coating methods using a bar coater (for example, a wire bar coater), an extrusion die coater, an air doctor coater, a blade coater, a rod coater, a knife coater, a squeeze coater, a reserve roll coater, a gravure coater, or a flexo coater. The details of the ink jet method are the same as the details of the ink jet method in the image forming step described below.

From the viewpoint of the productivity of the printed material, it is preferable that the overcoat liquid is applied using a gravure coater or a flexo coater.

The amount of the overcoat liquid to be applied is not particularly limited.

The ratio (hereinafter, also referred to as "applied mass ratio [overcoat liquid/aggregating liquid]") of the mass ($g/m^2$) of the overcoat liquid to be applied per unit area to the mass ($g/m^2$) of the aggregating liquid to be applied per unit area is preferably 1.0 or greater.

In a case where the applied mass ratio [overcoat liquid/aggregating liquid] is 1.0 or greater, the effect of suppressing the transfer of the overcoat layer is more effectively exhibited. From the viewpoint of allowing the effect of suppressing the transfer of the overcoat layer to be more effectively exhibited, the applied mass ratio [overcoat liquid/aggregating liquid] is more preferably 1.5 or greater.

From the viewpoint of further improving the image quality of the image, the upper limit of the applied mass ratio [overcoat liquid/aggregating liquid] is preferably 20 or less, more preferably 15 or less, and still more preferably 10 or less.

In the overcoat layer fainting step, the overcoat liquid may be heated and dried after the overcoat liquid is applied onto the region to which the aggregating liquid has been applied, in the impermeable base material on which the image has been formed.

Examples of the means for performing heating and drying the overcoat liquid include known heating means such as a heater, known air blowing means such as a dryer, and means for combining these.

Examples of the method for performing heating and drying the overcoat liquid include a method of applying heat from a side opposite to the surface of the impermeable base material, to which the overcoat liquid has been applied, using a heater or the like; a method of applying warm air or hot air to the surface of the impermeable base material to which the overcoat liquid has been applied; a method of applying heat from the surface of the impermeable base material to which the overcoat liquid has been applied or from a side opposite to the surface of the impermeable base material, to which the overcoat liquid has been applied, using an infrared heater; and a method of combining a plurality of these methods.

The heating temperature at the time of heating and drying the overcoat liquid is preferably 50° C. or higher and more preferably 60° C. or higher.

The upper limit of the heating temperature is not particularly limited, and the upper limit thereof may be 100° C. and preferably 90° C.

The time of heating and drying the overcoat liquid is not particularly limited, but is preferably in a range of 0.1 seconds to 60 seconds, more preferably in a range of 0.1 seconds to 30 seconds, and particularly preferably in a range of 0.1 seconds to 20 seconds.

<Example of Image Forming Device>

Hereinafter, an example of an image forming device suitable for the image forming method according to the present embodiment will be described with reference to FIG. 1.

FIG. 1 is a view conceptually illustrating an example of an image forming device suitable for the image forming method according to the present embodiment. As illustrated in FIG. 1, the image forming device according to the present example is a device that unwinds a long impermeable base material S1 wound in a roll shape using an unwinding device W1, transports the unwound impermeable base material S1 in the direction of the block arrows, allowing the impermeable base material S1 to pass through an aggregating liquid application device A1, an aggregating liquid drying zone Dry1, an ink jet ink application device IJ1, an ink drying zone Dry2, an overcoat liquid application device OC1, and an overcoat liquid drying zone Dry3 in this order, and finally winds the resulting base material using a winding device W2.

Since FIG. 1 is a conceptual view, the transport path of the impermeable base material S1 is simplified and the impermeable base material S1 is illustrated in a manner that the material is to be transported in one direction. Practically, it goes without saying that the transport path of the impermeable base material Si may meander. As a transport system of the impermeable base material S1, various web transport systems such as a barrel and a roller can be appropriately selected.

In regard to the portions other than the overcoat liquid application device OC1 and the overcoat liquid drying zone Dry3 in the image forming device according to the present example, known image forming devices described in JP2010-083021A, JP2009-234221A, and JP1998-175315A (JP-H10-175315A) can be referred to as appropriate.

The above-described aggregating liquid application step is performed by the aggregating liquid application device A1 and the aggregating liquid drying zone Dry1. The aggregating liquid drying zone Dry1 may be omitted.

As the method and the conditions for applying the aggregating liquid using the aggregating liquid application device A1, the method and the conditions described in the section of the aggregating liquid application step can be employed.

As the method and the conditions for drying the aggregating liquid using the aggregating liquid drying zone Dry1, the method and the conditions described in the section of the aggregating liquid application step can be employed.

Further, a surface treatment portion (not illustrated) for performing a surface treatment (preferably a corona treatment) on the impermeable base material S1 may be provided on the upstream side of the impermeable base material S1 in the transport direction with respect to the aggregating liquid application device A1.

The above-described image forming step is performed by the ink application device IJ1 and the ink drying zone Dry2. The ink drying zone Dry2 may be omitted.

As the method and the conditions for applying the aggregating liquid using the ink application device IJ1, the method and the conditions described in the section of the image forming step can be employed.

As the method and the conditions for drying the aggregating liquid using the ink drying zone Dry2, the method and the conditions described in the section of the image forming step can be employed.

Although not illustrated, the structure of the ink application device IJ1 can be designed as a structure comprising at least one ink jet head.

The ink jet head may be a shuttle head, but it is preferable that the ink jet head is a line head in which a plurality of jetting ports (nozzles) are arranged in the width direction of the long impermeable base material from the viewpoint of increasing the speed of image formation.

From the viewpoint of increasing the speed of image formation, it is preferable that the structure of the ink application device IJ1 is a structure comprising at least one of a line head for a black (K) ink, a line head for a cyan (C) ink, a line head for a magenta (M) ink, and a line head for a yellow (Y) ink.

It is more preferable that the structure of the ink application device IJ1 is a structure which comprises at least two line heads from among the four line heads described above and in which these two or more line heads are arranged in the transport direction (the direction of the block arrows) of the impermeable base material.

The ink application device IJ1 may further comprise at least one light head of a line head for a white ink, a line head for an orange ink, a line head for a green ink, a line head for a purple ink, a line head for a light cyan ink, and a line head for a light magenta ink.

As the method and the conditions for drying the aggregating liquid using the ink drying zone Dry2, the method and the conditions described in the section of the image forming step can be employed.

The above-described overcoat layer forming step is performed by the overcoat liquid application device OC1 and the overcoat liquid drying zone Dry3. The overcoat liquid drying zone Dry3 may be omitted. As the method and the conditions for applying the overcoat liquid using the overcoat liquid application device OC1, the method and the conditions described in the section of the overcoat layer forming step can be employed.

As the method and the conditions for drying the overcoat liquid using the overcoat liquid drying zone Dry3, the method and the conditions described in the section of the overcoat layer forming step can be employed.

<Reference form>

An image forming method according to a reference form of the present disclosure includes a step of preparing the ink that contains a coloring material, water, and an organic solvent; a step of preparing an aggregating liquid which contains an aggregating agent aggregating components in the ink and water; a step of preparing the overcoat liquid that contains a resin, inorganic particles (preferably inorganic particles having a Mohs hardness of 4 or greater), and an organic solvent; a step of applying the aggregating liquid onto an impermeable base material; a step of applying the ink to at least a portion of a region in the impermeable base material to which the aggregating liquid has been applied according to an ink jet method to form an image; and a step of applying the overcoat liquid onto the region to which the aggregating liquid has been applied, in the impermeable base material on which the image has been formed to form an overcoat layer.

The image forming method according to the reference form may include other steps as necessary.

The image forming method according to the reference form is not limited to the kind and the content of the organic solvents contained in the ink or the kind and the content of the organic solvents contained in the overcoat liquid, and the image forming method is the same as the image forming method according to the present embodiment and the preferable aspects thereof are also the same as described above except that the overcoat liquid contains inorganic particles.

The preferable aspects of the image forming method according to the reference form may correspond to the preferable aspects of the image forming method according to the present embodiment.

According to the image forming method of the reference form, the overcoat liquid contains inorganic particles, and thus the transfer of the overcoat layer is suppressed, compared to a case where the overcoat liquid does not contain inorganic particles.

That is, according to the image forming method of the reference form, it is possible to form an image with an excellent image quality and an overcoat layer which covers at least the image and is unlikely to be transferred to another object.

Ink Set

Embodiment

An ink set according to an embodiment of the present disclosure comprises an ink which contains a coloring material, water, and organic solvents A having a vapor pressure of 0.20 kPa or less at 20° C. and in which the content of the organic solvents A is 10% by mass or greater with respect to the total amount of the ink; an aggregating agent which aggregates components in the ink and an aggregating liquid containing water; and an overcoat liquid which contains a resin and organic solvents B having a vapor pressure of 2.50 kPa or greater at 20° C. and in which a content of the organic solvents B is 10% by mass or greater with respect to the total amount of the overcoat liquid.

In the ink set according to the present embodiment, the ink, the aggregating liquid, and the overcoat liquid are respectively the same as the ink, the aggregating liquid, and the overcoat liquid used for the image forming method according to the present embodiment.

Accordingly, the same effects as the effects of the image forming method according to the present embodiment are exhibited by performing the image forming method according to the present embodiment using the ink set according to the present embodiment.

That is, according to the ink set according to the present embodiment, an image with an excellent image quality can be formed, an overcoat layer that covers at least the image and is unlikely to be transferred to another object can be formed, and the jetting stability of the ink during the formation of the image is excellent.

The ink, the aggregating liquid, and the overcoat liquid which are comprised in the ink set according to the present embodiment may be used alone or two or more kinds thereof.

For example, the ink set according to the present embodiment may comprise two or more kinds of inks.

<Reference Form>

An ink set according to a reference form comprises an ink that contains a coloring material, water, and an organic solvent; an aggregating agent which aggregates components in the ink and an aggregating liquid containing water; and an overcoat liquid that contains a resin, inorganic particles (preferably inorganic particles having a Mohs hardness of 4 or greater), and an organic solvent.

The ink set according to the reference form is not limited to the kind and the content of the organic solvents contained in the ink or the kind and the content of the organic solvents contained in the overcoat liquid, and the ink set is the same as the ink set according to the present embodiment and the preferable aspects thereof are also the same as described above except that the overcoat liquid contains inorganic particles.

The preferable aspects of the ink set according to the reference form may correspond to the preferable aspects of the ink set according to the present embodiment.

In a case where the image forming method according to the reference form is performed using the ink set according to the reference form, the overcoat liquid contains inorganic particles, and thus the transfer of the overcoat layer is suppressed, compared to the case where the overcoat liquid does not contain inorganic particles.

That is, according to the image forming method of the reference form, it is possible to form an image with an excellent image quality and an overcoat layer that is unlikely to be transferred to another object.

The ink, the aggregating liquid, and the overcoat liquid which are comprised in the ink set according to the reference form may be used alone or two or more kinds thereof.

For example, the ink set according to the reference form may comprise two or more kinds of inks.

EXAMPLES

Hereinafter, examples of the present disclosure will be described, but the present disclosure is not limited to the following examples.

Further, "parts" and "%" are on a mass basis unless otherwise specified.

Further, ion exchange water was used as water.

Example 1

<Preparation of Aggregating Liquid>

An aggregating liquid with the following composition was prepared.

—Composition of Aggregating Liquid—

Malonic acid (manufactured by Wako Pure Chemical Industries, Ltd., dicarboxylic acid) . . . 5% by mass Eastek™ 1200 (manufactured by Eastman Chemical Company, polyester resin particles, volume average particle diameter of 30 nm; hereinafter, referred to as "PE1") . . . 10% by mass as amount of resin particles 1,2-Propanediol (manufactured by Wako Pure Chemical Industries, Ltd., SP value of 35 MPa$^{1/2}$) . . . 10% by mass Antifoaming agent (manufactured by Momentive Performance Materials Japan LLC, TSA-739 (15% by mass), emulsion type silicon antifoaming agent) . . . 0.01% by mass as amount of solid content in antifoaming agent Water . . . remaining amount set such that the total amount of the composition was 100% by mass <Preparation of Cyan Ink>

The cyan ink with the following composition was prepared.

—Composition of Cyan Ink—

Projet Cyan APD1000 (manufactured by FUJIFILM Imaging Colorants Inc., cyan pigment dispersion liquid, pigment concentration: 12% by mass) . . . 2.4% by mass as amount of solid content 1,2-PD (organic solvent A; 1,2-propanediol, vapor pressure of 0.01 kPa at 20° C. ("20° C. VP" in Table 1), SP value of 35 MPa1/2, manufactured by Wako Pure Chemical Industries, Ltd.) . . . 20% by mass OLFINE E1010 (surfactant, manufactured by Nissan Chemical Co., Ltd.) . . . 1% by mass Polymer particles B-01 (resin particles) shown below . . . 8% by mass SNOWTEX (registered trademark) XS (manufactured by Nissan Chemical Co., Ltd., colloidal silica) . . . 0.06% by mass as amount of solid content in silica Water . . . remaining amount set such that the total amount of the composition was 100% by mass (Synthesis of Polymer Particles B-01)

Polymer particles B-01 were produced in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Wako Pure Chemical Industries, Ltd., dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to the amount of 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 mL/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained liquid.

The obtained liquid was filtered using a filter having a mesh diameter of 1 µm, and the filtrate was collected, thereby obtaining an aqueous dispersion containing polymer particles B-01 whose concentration of solid contents was 26.5% by mass.

<Preparation of Overcoat Liquid>

(Preparation of 30 mass % toluene solution of polyurethane resin PU2)

A four-neck flask provided with a stirrer, a cooling pipe, and a nitrogen gas introduction pipe was charged with 100 parts by mass of 3-methyl-1,5-pentyleneadipatediol having a number average molecular weight of 2000, 100 parts by mass of polypropylene glycol having a number average molecular weight of 2000, and 44.4 parts by mass of isophorone diisocyanate, and the solution was allowed to react at 100° C. to 105° C. for 6 hours while nitrogen gas was introduced thereto. The obtained liquid was naturally cooled such that the liquid temperature reached 30° C., 200 parts by mass of toluene was added to the liquid, 0.5 parts by mass of monoethanolamine was added thereto, and the reaction was stopped. A 30 mass % toluene solution of the polyurethane resin PU2 was obtained by adding toluene to the obtained liquid.

The Mw of the polyurethane resin PU2 was 50000.

(Preparation of Overcoat Liquid)

An overcoat liquid with the following composition was prepared using the 30 mass % toluene solution of the polyurethane resin PU2 described above, toluene, ethyl acetate, and rutile type titanium oxide particles CR-50 shown below.

—Composition of Overcoat Liquid—

PU2 (the above-described polyurethane resin PU2) . . . 10% by mass

TOL (organic solvent B: toluene, vapor pressure of 2.90 kPa at 20° C., SP value of 18 MPa$^{1/2}$) . . . 28% by mass . . . EA (organic solvent B: ethyl acetate, vapor pressure of 8.70 kPa at 20° C., SP value of 18 MPa$^{1/2}$) . . . 28% by mass TiO$_2$ (R): (rutile type titanium oxide particles CR-50 (manufactured by Ishihara Sangyo Kaisha, Ltd.), average volume particle diameter of 0.25 µm) . . . 34% by mass <Formation of Image and Overcoat Layer>

An image and an overcoat layer were formed using the aggregating liquid, the cyan ink, and the overcoat liquid described above and using a polyethylene terephthalate (PET) base material as the impermeable base material.

As the image forming device, the image forming device illustrated in FIG. 1 according to the above-described example was used.

A PET base material "FE2001" (thickness of 25 µm) (manufactured by Futamura Chemical Co., Ltd.) was used as the impermeable base material S1.

The transport speed (that is, the traveling speed of the impermeable base material S1) of the impermeable base material Si was set to 635 mm/sec.

A wire bar coater was used as the aggregating liquid application device A 1.

As the drying method in the aggregating liquid drying zone Dry1, a drying method using warm air was employed.

The ink jet head in the ink application device IJ1 and the ink jetting conditions are as follows.

Ink jet head: A piezo full line head (the number of all nozzles was 2048)) with 1200 dpi (dot per inch, 1 inch indicates 2.54 cm) and a width of 20 inches was used.

Ink droplet amount: Each amount was set to 2.4 pL.

Driving frequency: 30 kHz

As the drying method in the ink drying zone Dry2, a drying method using warm air was employed.

As the overcoat liquid application device OC1, a gravure coater was used.

As the drying method in the overcoat liquid drying zone Dry3, a drying method using warm air was employed.

First, a roll body obtained by winding the impermeable base material S1 (the above-described PET base material "FE2001") with a thickness of 25 µm, a width of 500 mm, and a length of 2000 m in a roll shape (hereinafter, also referred to as a roll body 1") was prepared. This roll body 1 was set on the unwinding device W1.

Further, the above-described aggregating liquid was set on the aggregating liquid application device A1, the above-described cyan ink was set on the ink application device IJ1, and the above-described overcoat liquid was set on the overcoat liquid application device OC1.

(Aggregating Liquid Application Step)

The impermeable base material S1 was unwound from the roll body 1 by the unwinding device W1, and the unwound impermeable base material Si was transported at the above-described transport speed.

One entire surface of the impermeable base material Si during the transport was coated with the above-described aggregating liquid such that the mass of the aggregating liquid to be applied per unit area by the aggregating liquid application device A1 was 1.7 g/m$^2$. The applied aggregating liquid was dried in the aggregating liquid drying zone Dry1 at 80° C. for 3 seconds.

(Image Forming Step)

The above-described cyan ink was applied to a portion of the region (that is, one entire surface) of the impermeable base material S1, which had been coated with the aggregating liquid, in the form of a solid image using the ink application device IJ1 according to an ink jet method. Here, the region to which the cyan ink was applied was set as a strip-like region having a width of 250 mm centering on the central portion in the width direction with respect to a total width of 500 mm of the impermeable base material S1. The mass of the cyan ink to be applied per unit area in the region to which the cyan ink was applied was set to 3 g/m².

Next, the applied cyan ink was dried in the ink drying zone Dry2 at 80° C. for 8 seconds.

In this manner, a cyan solid image was formed on the above-described entire strip-like region with a width of 250 mm. Each region with a width of 125 mm in each of both end portions of the impermeable base material Si in the width direction was set as a non-image forming region.

(Overcoat Layer Forming Step)

Next, the above-described overcoat liquid was applied to one entire surface (in other words, the entire region coated with the aggregating liquid) of the impermeable base material S1 which was formed of the cyan solid image and the non-image forming region by the overcoat liquid application device OC1. At this time, the mass of the overcoat liquid to be applied per unit area was 6 g/m². That is, the ratio between the mass of the overcoat liquid to be applied and the mass of the aggregating liquid to be applied was set to 3.5.

The applied overcoat liquid was dried in the overcoat liquid drying zone Dry3 at 80° C. for 5 seconds, thereby forming an overcoat layer covering the cyan solid image and the non-image forming region.

Finally, the impermeable base material Si on which the cyan solid image and the overcoat layer had been formed was wound by the winding device W2 under a condition in which the winding pressure (surface pressure) was set to 50 kPa.

Hereinafter, the wound impermeable base material S1 was set as a "roll body 2".

<Evaluation of Jetting Stability of Ink>

In the above-described ink jet head (the number of all nozzles was 2048), the number of non-jetting nozzles was adjusted to 10 or less, and the cyan ink was continuously jetted from this ink jet head for 80 minutes.

Hereinafter, the number of jetting nozzles after the adjustment was set as the "number of initial jetting nozzles".

Next, the jetting of the cyan ink was stopped, and the ink jet head was allowed to stand for 24 hours while the jetting of the cyan ink was stopped.

Next, the cyan ink was continuously jetted again, and the ratio of the number of the non-jetting nozzles to the number of the initial jetting nozzles was confirmed at the time point after 5 minutes from the start of jetting the ink.

Based on the confirmed results, the jetting stability of the ink was evaluated based on the following evaluation standards. In the evaluation standards, the rank with the most excellent jetting stability of the ink is 5.

The results are listed in Table 1.

—Evaluation Standards—

5: The ratio of the number of the non-jetting nozzles to the number of initial jetting nozzles was 0%.

4: The ratio of the number of the non-jetting nozzles to the number of initial jetting nozzles was greater than 0% and less than or equal to 1%.

3: The ratio of the number of the non-jetting nozzles to the number of initial jetting nozzles was greater than 1% and less than or equal to 2%.

2: The ratio of the number of the non-jetting nozzles to the number of initial jetting nozzles was greater than 2% and less than or equal to 5%.

1: The ratio of the number of the non-jetting nozzles to the number of initial jetting nozzles was greater than 5%.

<Evaluation of Transfer of Overcoat Layer>

The impermeable base material S1 was unwound from the roll body 2 (that is, the impermeable base material S wound after the cyan solid image and the overcoat layer were formed).

In the unwound impermeable base material S1, a region with a length of 500 mm and a width of 500 mm (that is the total width of the impermeable base material S1) in the longitudinal direction at a position of 1000 m in the longitudinal direction from one end portion in the longitudinal direction was selected as the observation region.

The presence of transfer marks (that is, marks transferred to the rear surface of the impermeable base material S1) of the overcoat layer in this observation region was confirmed. In a case where transfer marks were present, the area thereof was measured.

Based on the above-described results, the transfer of the overcoat layer was evaluated based on the following evaluation standards.

In the following evaluation standards, the rank that the transfer of the overcoat layer was most suppressed was 5.

The results are listed in Table 1.

—Evaluation Standards—

5: Transfer marks of the overcoat layer were not found at all (the area of transfer marks of the overcoat layer was 0% with respect to the total area of the observation region).

4: The area of the transfer marks of the overcoat layer was greater than 0% and less than 1% with respect to the total area of the observation region.

3: The area of the transfer marks of the overcoat layer was 1% or greater and less than 3% with respect to the total area of the observation region.

2: The area of the transfer marks of the overcoat layer was 3% or greater and less than 10% with respect to the total area of the observation region.

1: The area of the transfer marks of the overcoat layer was 10% or greater with respect to the total area of the observation region.

<Evaluation of Image Quality>

Character images covered with the overcoat layer were formed in the same manner as the formation of the cyan solid image and the overcoat layer.

Figure 2:
FIG. 2 is a view conceptually showing mirror images of a character used for evaluation of the image quality in examples.
Figure 2:
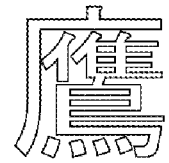
Figure 2:
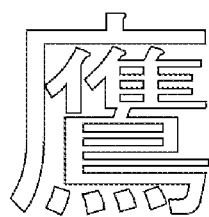
Figure 2:
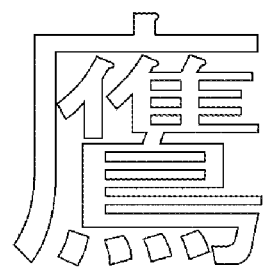

The formed character images were set as images (that is, the mirror images with respect to the character images shown in FIG. 2) obtained by reversing the left side and the right side of the character images (Unicode: U+9DF9: 2pt, 3pt, 4pt, and 5pt) shown in FIG. 2. Here, pt indicates the DTP point representing the font size, and 1 pt is 1/72 inch.

The formed character images were observed from the base material side (that is, a side of the surface of the base material opposite to the surface where the character images were formed), and the image quality was evaluated based on the following evaluation standards.

The results are listed in Table 1.

—Evaluation Standards—

5: 2 pt characters were able to be reproduced.

4: 3 pt characters were able to be reproduced, but 2 pt characters were not able to be reproduced.

3: 4 pt characters were able to be reproduced, but 3 pt characters were not able to be reproduced.

2: 5 pt characters were able to be reproduced, but 4 pt characters were not able to be reproduced.

1: 5 pt characters were not able to be reproduced.

Figure 3:
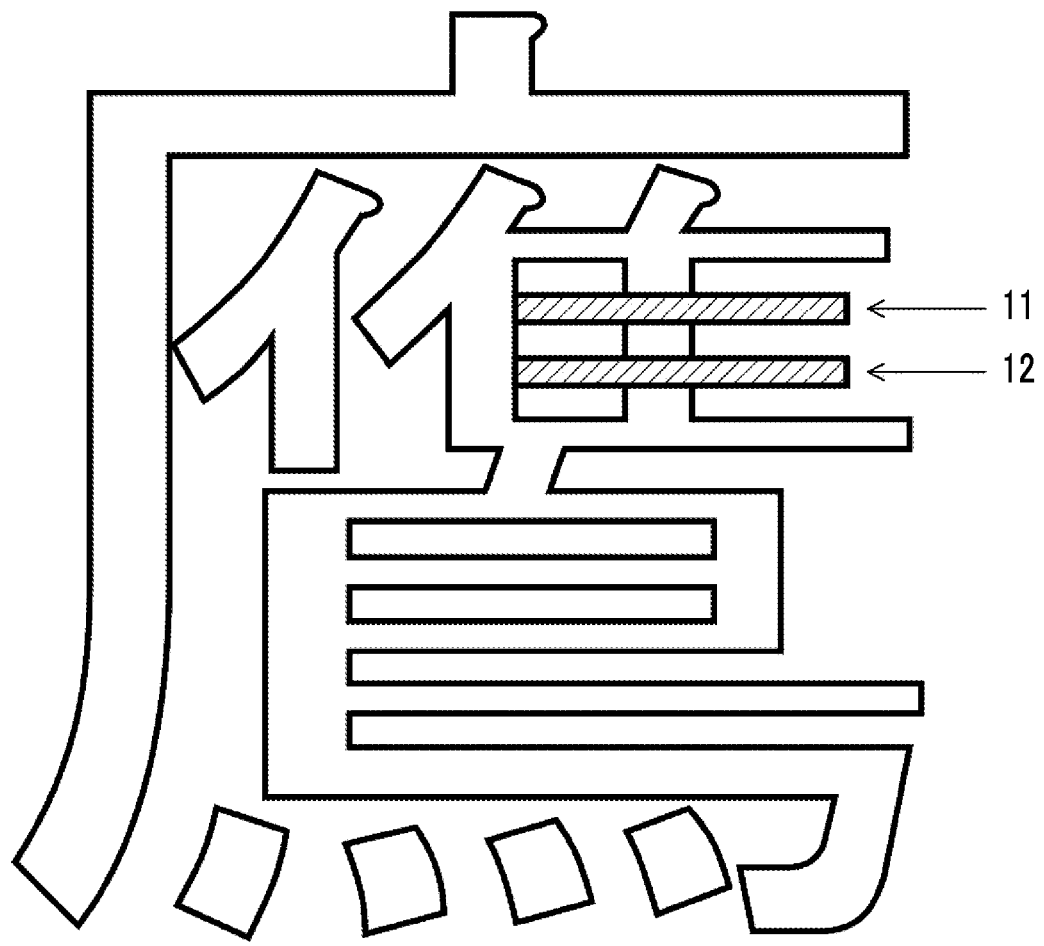
FIG. 3 is a view for describing the details of the evaluation standards for the image quality in the examples.

Further, the expression "able to be reproduced" means that the horizontal line indicated by 11 shown in FIG. 3 and the horizontal line indicated by 12 shown in FIG. 3 in the character images shown in FIG. 2 were separated in a case where the characters were confirmed from a place separated by 0.5 m.

<Evaluation of Adhesiveness>

In the region where the cyan solid image was formed (hereinafter, also referred to as an "adhesiveness evaluation region") among regions adjacent to the observation region for evaluation of the transfer of the overcoat layer, the adhesiveness of the image was evaluated.

In the adhesiveness evaluation region, the adhesiveness of the image was evaluated by attaching a tape piece of Sellotape (registered trademark, No. 405, manufactured by Nichiban Co., Ltd., width of 12 mm, hereinafter, also referred to as "tape") onto the overcoat layer covering the cyan solid image and peeling the tape piece from the overcoat layer. Specifically, the attachment and the peeling of the tape were performed according to the following method.

The tape was taken out at a constant speed and cut into a length of approximately 75 mm to obtain a tape piece.

The obtained tape piece was overlapped on the overcoat layer, and a region with a width of 12 mm and a length of 25 mm at the central portion of the tape piece was attached and firmly rubbed with a fingertip.

An end of the tape piece was grasped within 5 minutes from the attachment of the tape piece and peeled off at an angle as close to 60° as possible for 0.5 to 1.0 seconds.

The presence of the adhesive material in the tape piece which had been peeled off and the presence of peeling of the image (specifically, the cyan solid image covered with the overcoat layer) from the impermeable base material were visually observed, and the adhesiveness of the image was evaluated based on the following evaluation standards.

The results are listed in Table 1.

—Evaluation Standards—

5: The adhesive material was not found on the tape piece, and peeling of the image from the impermeable base material was not found.

4: Some colored adhesive materials were found on the tape piece, but peeling of the image from the impermeable base material was not found.

3: Some colored adhesive materials were found on the tape piece, and peeling of the image from the impermeable base material was slightly visually, but the peeling was in a practically acceptable range.

2: Colored adhesive materials were found on the tape piece, and peeling of the image from the impermeable base material was slightly visually. Further, the peeling was not in a practically acceptable range.

1: Colored adhesive materials were found on the tape piece, most of the image was peeled off from the impermeable base material, and thus the impermeable base material was visually confirmed.

Examples 2 to 4

The same operation as in Example 1 was performed except that the kind and the mount of the organic solvents A (specifically, the organic solvents A having a vapor pressure of 0.20 kPa or less at 20° C.) in the cyan ink were changed as listed in Table 1. Example 3 is an example in which two kinds of the organic solvents A were used.

The results are listed in Table 1.

Example 5

The same operation as in Example 1 was performed except that the kind of the resin in the overcoat liquid was changed to the following polyamide resin PA1 by changing a 30 mass % toluene solution of the polyurethane resin PU2 used for preparation of the overcoat liquid to a 30 mass % toluene solution of the same mass of the polyamide resin PA1 shown below.

The results are listed in Table 1.

Preparation of 30 Mass % Toluene Solution of Polyamide PA1)

A 30 mass % toluene solution of the polyamide resin PA1 was prepared by dissolving "VEGECHEM GREEN (registered trademark) V930" serving as a polyamide resin PA1 in toluene.

Example 6

The same operation as in Example 1 was performed except that the overcoat liquid with the composition listed in Table 1 was prepared using a 30 mass % IPA solution of the polyurethane resin PU2 in place of the 30 mass % toluene solution of the polyurethane resin PU2 in the preparation of the overcoat liquid.

The results are listed in Table 1.

In Example 6, the content of the resin is 10% by mass with respect to the total amount of the overcoat liquid, and the content of the inorganic particles is 34% by mass with respect to the total amount of the overcoat liquid.

(Preparation of 30 Mass % IPA Solution of Polyurethane Resin PU2)

A 30 mass % IPA solution of the polyurethane resin PU2 was prepared in the same manner as described above except that the toluene added to the liquid after the reaction for 6 hours was changed to isopropyl alcohol (IPA) in the "preparation of the 30 mass % toluene solution of the polyurethane resin PU2" in Example 1.

Examples 7 to 10

The same operation as in Example 1 was performed except that the overcoat liquid with the composition listed in Table 1 was prepared using a 30 mass % solution of the polyurethane resin PU3 shown below in place of the 30 mass % toluene solution of the polyurethane resin PU2 in the preparation of the overcoat liquid.

The results are listed in Table 1.

In all Examples 7 to 10, the content of the resin is 10% by mass with respect to the total amount of the overcoat liquid, and the content of the inorganic particles is 34% by mass with respect to the total amount of the overcoat liquid.

Preparation of 30 mass % Solution of Polyurethane Resin PU3)

A four-neck flask provided with a stirrer, a cooling pipe, and a nitrogen gas introduction pipe was charged with 30.3 parts of polytetramethylene glycol having a number average molecular weight of 2000, 25.0 parts of polyethylene glycol having a number average molecular weight of 2000, 5.84 parts of cyclohexanedimethanol, 9.25 parts of dimethylolpropionic acid, and 29.6 parts of isophorone diisocyanate, and the solution was allowed to react at 140° C. for 6 hours while nitrogen gas was introduced thereto. The obtained liquid was naturally cooled such that the liquid temperature reached 30° C., and a mixed solution of 3.14 parts of 28% ammonia water, water, and isopropyl alcohol was added dropwise to this liquid, thereby obtaining a 30 mass % solution (the solvent was a mixed solvent of water (2 parts) and isopropyl alcohol (1 part)) of the polyurethane resin PU3.

The Mw of the polyurethane resin PU3 was 50000.

Examples 11 and 12

The same operation as in Example 1 was performed except that the resin particles in the aggregating liquid were changed as in Table 1.
The results are listed in Table 1.

Example 13

The same operation as in Example 1 was performed except that the impermeable base material was changed as in Table 1.
The results are listed in Table 1.

Example 14

The same operation as in Example 1 was performed except that the composition of the overcoat liquid was changed as in Table 1.
The results are listed in Table 1.
In Example 14, the content of the resin is 10% by mass with respect to the total amount of the overcoat liquid, and the content of the inorganic particles is 34% by mass with respect to the total amount of the overcoat liquid.

Example 15

The same operation as in Example 1 was performed except that the amount of the organic solvent A in the cyan ink was changed to 10% by mass, and the amount of water was adjusted such that the total amount of the cyan ink was set to 100% by mass.
The results are listed in Table 1.

Example 16

The same operation as in Example 1 was performed except that the resin particles (PE1) in the aggregating liquid were not used (specifically, PE1 was changed to the same mass of water).
The results are listed in Table 1.

Examples 17 and 18

The same operation as in Example 1 was performed except that the inorganic particles in the overcoat liquid was changed as listed in Table 1.
The results are listed in Table 1.

Example 19

The same operation as in Example 1 was performed except that the inorganic particles in the overcoat liquid were not used (specifically, the inorganic particles were replaced with the same mass of the resin (PU2)).
The results are listed in Table 1.

Examples 20 to 22

The same operation as in Example 1 was performed except that the aggregating agent in the aggregating liquid was changed to the same mass of the aggregating agent listed in Table 2.
The results are listed in Table 2.

Examples 23 to 260

The same operation as in Example 1 was performed except that the kind of the organic solvent A in the cyan ink was changed as listed in Table 2.
The results are listed in Table 2.

Comparative Example 1

The same operation as in Example 1 was performed except that the kind of the organic solvent A in the cyan ink was changed as listed in Table 2.
The results are listed in Table 2.

Comparative Example 2

The same operation as in Example 1 was performed except that the amount of the organic solvent A in the cyan ink was changed to 7% by mass, and the amount of water was adjusted such that the total amount of the cyan ink was set to 100% by mass.
The results are listed in Table 2.

Comparative Examples 3 to 5

The same operation as in Example 1 was performed except that the overcoat liquid with the composition listed in Table 2 was prepared using a 30 mass % 1,2-PD solution (Comparative Examples 3 and 4) of the polyurethane resin PU2 or a 30 mass % BA solution (Comparative Example 5) of the polyurethane resin PU2 shown below in place of the 30 mass % toluene solution of the polyurethane resin PU2 in the preparation of the overcoat liquid.
The results are listed in Table 2.
In all Comparative Examples 3 to 5, the content of the resin is 10% by mass with respect to the total amount of the overcoat liquid, and the content of the inorganic particles is 34% by mass with respect to the total amount of the overcoat liquid.

(Preparation of 30 Mass % 1,2-PD Solution of Polyurethane Resin PU2; Comparative Examples 3 and 4)
A 30 mass % 1,2-PD solution of the polyurethane resin PU2 was prepared in the same manner as described above except that the toluene added to the liquid after the reaction for 6 hours was changed to 1,2-propanediol (1,2-PD) in the "preparation of the 30 mass % toluene solution of the polyurethane resin PU2" in Example 1.

(Preparation of 30 Mass % BA Solution of Polyurethane Resin PU2; Comparative Example 5)
A 30 mass % BA solution of the polyurethane resin PU2 was prepared in the same manner as described above except that the toluene added to the liquid after the reaction for 6 hours was changed to butyl acetate (BA) in the "preparation of the 30 mass % toluene solution of the polyurethane resin PU2" in Example 1.

Comparative Example 6

The same operation as in Example 1 was performed except that the aggregating liquid was not used.
The results are listed in Table 2.

Comparative Example 7

The same operation as in Comparative Example 4 was performed except that the aggregating liquid was not used.
The results are listed in Table 2.

Comparative Example 8

The same operation as in Comparative Example 6 was performed except that the overcoat liquid was not used.
The results are listed in Table 2.

In Comparative Example 8 in which the aggregating liquid and the overcoat liquid were not used, the transfer of the cyan solid image was evaluated without evaluating the transfer of the overcoat layer.

The transfer of the cyan solid image was evaluated in the same manner as the evaluation of the transfer of the overcoat layer in Example 1 except for the following changes.

The observation region for the evaluation of the transfer of the cyan solid image was set to only a region (that is, a strip-like region having a width of 250 mm centering on the central portion in the width direction with respect to a total width of 500 mm of the impermeable base material S 1) where the cyan solid image was formed in the observation region (a length of 500 mm×a width of 500 mm in the longitudinal direction) for the evaluation of the transfer of the overcoat layer in Example 1.

The evaluation standard for the evaluation of the transfer of the cyan solid image was set as the evaluation standard in which the "area with the transfer marks of the overcoat layer" was changed to the "area with the transfer marks of the cyan solid image" in the evaluation standard in the evaluation of the transfer of the overcoat layer in Example 1.

TABLE 1

| | Impermeable base material | Aggregating liquid | | Cyan ink (unit of "amount" of each compound is % by mass) | | | | | | | | Overcoat liquid (unit of "amount" of each compound is % by mass) | | | |
|---|---|---|---|---|---|---|---|---|---|---|---|---|---|---|---|
| | | Aggregating agent | Resin particles | Organic solvent A or other solvents | | | | Organic solvent A | | | Water Amount | Organic solvent B or other solvents | | | |
| | | | | Type | Amount | 20° C. VP | SP | Amount | 20° C. VP | SP | | Type | Amount | 20° C. VP | SP |
| Example 1 | PET | MA | PE1 | 1,2-PD | 20 | 0.01 | 35 | | | | 69 | TOL | 28 | 2.90 | 18 |
| Example 2 | PET | MA | PE1 | 1,3-PD | 20 | 0.005 | 35 | | | | 69 | TOL | 28 | 2.90 | 18 |
| Example 3 | PET | MA | PE1 | 1,2-PD | 18 | 0.01 | 35 | GL | 2 | Less than 0.001 | 48 | 69 | TOL | 28 | 2.90 | 18 |
| Example 4 | PET | MA | PE1 | PGmBE | 20 | 0.11 | 21 | | | | 69 | TOL | 28 | 2.90 | 18 |
| Example 5 | PET | MA | PE1 | 1,2-PD | 20 | 0.01 | 35 | | | | 69 | TOL | 28 | 2.90 | 18 |
| Example 6 | PET | MA | PE1 | 1,2-PD | 20 | 0.01 | 35 | | | | 69 | IPA | 56 | 4.30 | 21 |
| Example 7 | PET | MA | PE1 | 1,2-PD | 20 | 0.01 | 35 | | | | 69 | IPA | 26 | 4.30 | 21 |
| Example 8 | PET | MA | PE1 | 1,2-PD | 20 | 0.01 | 35 | | | | 69 | IPA | 30 | 4.30 | 21 |
| Example 9 | PET | MA | PE1 | 1,2-PD | 20 | 0.01 | 35 | | | | 69 | IPA | 38 | 4.30 | 21 |
| Example 10 | PET | MA | PE1 | PGmBE | 20 | 0.11 | 21 | | | | 69 | IPA | 35 | 4.30 | 21 |
| Example 11 | PET | MA | PU1 | 1,2-PD | 20 | 0.01 | 35 | | | | 69 | TOL | 28 | 2.90 | 18 |
| Example 12 | PET | MA | PE2 | 1,2-PD | 20 | 0.01 | 35 | | | | 69 | TOL | 28 | 2.90 | 18 |
| Example 13 | OPP | MA | PE1 | 1,2-PD | 20 | 0.01 | 35 | | | | 69 | TOL | 28 | 2.90 | 18 |
| Example 14 | PET | MA | PE1 | 1,2-PD | 20 | 0.01 | 35 | | | | 69 | TOL | 23 | 2.90 | 18 |
| Example 15 | PET | MA | PEI | 1,2-PD | 10 | 0.01 | 35 | | | | 79 | TOL | 28 | 2.90 | 18 |
| Example 16 | PET | MA | | | | | | | | | | TOL | 28 | 2.90 | 18 |
| Example 17 | PET | MA | PE1 | 1,2-PD | 20 | 0.01 | 35 | | | | 69 | TOL | 28 | 2.90 | 18 |
| Example 18 | PET | MA | PE1 | 1,2-PD | 20 | 0.01 | 35 | | | | 69 | TOL | 28 | 2.90 | 18 |
| Example 19 | PET | MA | PE1 | 1,2-PD | 20 | 0.01 | 35 | | | | 69 | TOL | 28 | 2.90 | 18 |

| | Overcoat liquid (unit of "amount" of each compound is % by mass) | | | | | | | Inorganic particles | | | | Evaluation results | | | |
|---|---|---|---|---|---|---|---|---|---|---|---|---|---|---|---|
| | Organic solvent B or other solvents | | | | Water | | Resin | Type | Mohs hardness | $O_{SP}$ | $I_{SP}-O_{SP}$ | Jetting stability | Transfer | Image quality | Adhesion |
| | Type | Amount | 20° C. VP | SP | Amount | SP | | | | | | | | | |
| Example 1 | EA | 28 | 8.70 | 18 | | | PU2 | TiO2(R) | 7.0~7.5 | 18 | 17 | 5 | 5 | 5 | 5 |
| Example 2 | EA | 28 | 8.70 | 18 | | | PU2 | TiO2(R) | 7.0~7.5 | 18 | 17 | 5 | 5 | 5 | 5 |
| Example 3 | EA | 28 | 8.70 | 18 | | | PU2 | TiO2(R) | 7.0~7.5 | 18 | 18 | 5 | 5 | 5 | 5 |
| Example 4 | EA | 28 | 8.70 | 18 | | | PU2 | TiO2(R) | 7.0~7.5 | 18 | 3 | 4 | 4 | 5 | 5 |
| Example 5 | EA | 28 | 8.70 | 18 | | | PA1 | TiO2(R) | 7.0~7.5 | 18 | 17 | 5 | 5 | 5 | 5 |
| Example 6 | | | | | 18 | 49 | PU2 | TiO2(R) | 7.0~7.5 | 21 | 14 | 5 | 5 | 5 | 5 |
| Example 7 | EA | 12 | 8.70 | 18 | 2.3 | | PU3 | TiO2(R) | 7.0~7.5 | 29 | 6 | 5 | 5 | 5 | 5 |
| Example 8 | | | | | 2.3 | 26 | 49 | PU3 | TiO2(R) | 7.0 | 34 | 1 | 5 | 3 | 5 | 5 |

TABLE 1-continued

| Example | | | | | | | | | | | | | | | | |
|---|---|---|---|---|---|---|---|---|---|---|---|---|---|---|---|---|
| Example 9 | | | | | | | | PU3 | TiO2(R) | ~7.5<br>7.0<br>~7.5 | 30 | −2 | 5 | 3 | 5 | 5 |
| Example 10 | EA | 8.70 | 5 | 18 | 2.3 | 18 | 49 | PU3 | TiO2(R) | 7.0<br>~7.5 | 29 | −8 | 4 | 3 | 5 | 5 |
| Example 11 | EA | 8.70 | 23 | 18 | 2.3 | 16 | 49 | PU3 | TiO2(R) | 7.0<br>~7.5 | 18 | 17 | 5 | 5 | 5 | 5 |
| Example 12 | EA | 8.70 | 28 | 18 | | | | PU2 | TiO2(R) | 7.0<br>~7.5 | 18 | 17 | 5 | 3 | 5 | 5 |
| Example 13 | EA | 8.70 | 28 | 18 | | | | PU2 | TiO2(R) | 7.0<br>~7.5 | 18 | 17 | 5 | 5 | 5 | 3 |
| Example 14 | BA | 1.30 | 33 | 18 | | | | PU2 | TiO2(R) | 7.0<br>~7.5 | 18 | 17 | 5 | 3 | 5 | 5 |
| Example 15 | EA | 8.70 | 28 | 18 | | | | PU2 | TiO2(R) | 7.0<br>~7.5 | 18 | 17 | 3 | 5 | 5 | 5 |
| Example 16 | EA | 8.70 | 28 | 18 | | | | PU2 | TiO2(R) | 7.0<br>~7.5 | 18 | 17 | 5 | 5 | 5 | 3 |
| Example 17 | EA | 8.70 | 28 | 18 | | | | PU2 | TiO2(R) | ~5.5<br>6.0 | 18 | 17 | 5 | 5 | 5 | 5 |
| Example 18 | EA | 8.70 | 28 | 18 | | | | PU2 | BaSO4 | 3.0<br>~3.5 | 18 | 17 | 5 | 4 | 5 | 5 |
| Example 19 | EA | 8.70 | 28 | 18 | | | | PU2 | None | — | 18 | 17 | 5 | 3 | 5 | 5 |

TABLE 2

| | Impermeable base material | Aggregating liquid | | Cyan ink (unit of "amount" of each compound is % by mass) | | | | | | | | |
|---|---|---|---|---|---|---|---|---|---|---|---|---|
| | | Aggregating agent | Resin particles | Organic solvent A or other solvents | | | Organic solvent A | | | Water | | |
| | | | | Type | Amount | 20° C. VP | SP | Amount | 20° C. VP | SP | Amount | SP |
| Example 20 | PET | AA | PE1 | 1,2-PD | 20 | 0.01 | 18 | | | | | 35 |
| Example 21 | PET | MgSO4 | PE1 | 1,2-PD | 20 | 0.01 | 18 | | | | | 35 |
| Example 22 | PET | CA | PE1 | 1,2-PD | 20 | 0.01 | 18 | | | | | 35 |
| Example 23 | PET | MA | PE1 | PGmME | 20 | 0.09 | 24 | | | | | |
| Example 24 | PET | MA | PE1 | 1,2BPD | 20 | 0.003 | 31 | | | | | |
| Example 25 | PET | MA | PE1 | EGmPE | 20 | 0.02 | 23 | | | | | |
| Example 26 | PET | MA | PE1 | PGmPE | 20 | 0.02 | 23 | | | | | |
| Comparative Example 1 | PET | MA | PE1 | 2-ME | 7 | 0.80 | 25 | | | | | |
| Comparative Example 2 | PET | MA | PE1 | 1,2-PD | 20 | 0.01 | 18 | | | | | 35 |
| Comparative Example 3 | PET | MA | PE1 | 1,2-PD | 20 | 0.01 | 18 | | | | | 35 |
| Comparative Example 4 | PET | MA | PE1 | 1,2-PD | 20 | 0.01 | 18 | | | | | 35 |
| Comparative Example 5 | PET | MA | PE1 | 1,2-PD | 20 | 0.01 | 18 | | | | | 35 |
| Comparative Example 6 | PET | Aggregating agent was not available | | 1,2-PD | 20 | 0.01 | 18 | | | | | 35 |
| Comparative Example 7 | PET | Aggregating agent was not available | | 1,2-PD | 20 | 0.01 | 18 | | | | | 35 |
| Comparative Example 8 | PET | Aggregating agent was not available | | 1,2-PD | 20 | 0.01 | 18 | | | | | 35 |

| | Cyan ink (cont.) | | Overcoat liquid (unit of "amount" of each compound is % by mass) | | | | | | |
|---|---|---|---|---|---|---|---|---|---|
| | Water Amount | $I_{SP}$ | Organic solvent B or other solvents | | | | | | |
| | | | Type | Amount | 20° C. VP | SP | | | |
| Example 20 | 69 | 35 | TOL | 28 | 2.90 | 18 | | | |
| Example 21 | 69 | 35 | TOL | 28 | 2.90 | 18 | | | |
| Example 22 | 69 | 36 | TOL | 28 | 2.90 | 18 | | | |
| Example 23 | 69 | 24 | TOL | 28 | 2.90 | 18 | | | |
| Example 24 | 69 | 31 | TOL | 28 | 2.90 | 18 | | | |
| Example 25 | 69 | 23 | TOL | 28 | 2.90 | 18 | | | |
| Example 26 | 69 | 23 | TOL | 28 | 2.90 | 18 | | | |
| Comparative Example 1 | 69 | 25 | TOL | 28 | 2.90 | 18 | | | |
| Comparative Example 2 | 69 | 35 | TOL | 28 | 2.90 | 18 | | | |
| Comparative Example 3 | 69 | 35 | 1,2-PD | 49 | 0.01 | 35 | | | |
| Comparative Example 4 | 69 | 35 | 1,2-PD | 56 | 0.01 | 35 | | | |
| Comparative Example 5 | 69 | 35 | BA | 56 | 1.30 | 18 | | | |
| Comparative Example 6 | 69 | 35 | TOL | 28 | 2.90 | 18 | | | |
| Comparative Example 7 | 69 | 35 | 1,2-PD | 56 | 0.01 | 35 | | | |
| Comparative Example 8 | 79 | 35 | Overcoat liquid was not available | | | | | | |

| | Overcoat liquid (unit of "amount" of each compound is % by mass) | | | | | | Evaluation results | | | |
|---|---|---|---|---|---|---|---|---|---|---|
| | Organic solvent B or other solvents | | Water | Resin | Inorganic particles | | | | | |
| | Type | 20° C. VP | Amount | | | Type | Mohs hardness | $O_{SP}$ | $I_{SP}$ OSP | |
| Example 20 | EA | 8.70 | | PU2 | TiO2(R) | 7.0~7.5 | 18 | 17 | | |
| Example 21 | EA | 8.70 | | PU2 | TiO2(R) | 7.0~7.5 | 18 | 17 | | |
| Example 22 | EA | 8.70 | | PU2 | TiO2(R) | 7.0~7.5 | 18 | 17 | | |
| Example 23 | EA | 8.70 | | PU2 | TiO2(R) | 7.0~7.5 | 18 | 6 | | |
| Example 24 | EA | 8.70 | | PU2 | TiO2(R) | 7.0~7.5 | 18 | 13 | | |
| Example 25 | EA | 8.70 | | PU2 | TiO2(R) | 7.0~7.5 | 18 | 5 | | |

| | Evaluation results | | | | |
|---|---|---|---|---|---|
| | Jetting stability | Transfer | Image quality | Adhesion | |
| Example 20 | 5 | 5 | 3 | 5 | |
| Example 21 | 5 | 5 | 3 | 5 | |
| Example 22 | 5 | 5 | 3 | 5 | |
| Example 23 | 5 | 5 | 5 | 5 | |
| Example 24 | 5 | 5 | 5 | 5 | |
| Example 25 | 5 | 5 | 5 | 5 | |

TABLE 2-continued

| | | | | | | | | | | |
|---|---|---|---|---|---|---|---|---|---|---|
| Example 26 | EA | 8.70 | 28 | 18 | PU2 | TiO2(R) | 7.0~7.5 | 18 | 5 | 5 | 5 | 5 |
| Comparative Example 1 | EA | 8.70 | 28 | 18 | PU2 | TiO2(R) | 7.0~7.5 | 18 | 7 | 2 | 4 | 5 |
| Comparative Example 2 | EA | 8.70 | 28 | 18 | PU2 | TiO2(R) | 7.0~7.5 | 18 | 17 | 1 | 5 | 5 |
| Comparative Example 3 | EA | 8.70 | 7 | | PU2 | TiO2(R) | 7.0~7.5 | 33 | 2 | 5 | 2 | 4 |
| Comparative Example 4 | | | | | PU2 | TiO2(R) | 7.0~7.5 | 35 | 0 | 5 | 1 | 3 |
| Comparative Example 5 | | | | | PU2 | TiO2(R) | 7.0~7.5 | 18 | 17 | 5 | 2 | 4 |
| Comparative Example 6 | EA | 8.7 | 28 | 18 | PU2 | TiO2(R) | 7.0~7.5 | 18 | 17 | 5 | 5 | 2 |
| Comparative Example 7 | | | | | PU2 | TiO2(R) | 7.0~7.5 | 35 | 0 | 5 | 5 | 2 |
| Comparative Example 8 | | | | Overcoat liquid was not available | | | | | 35 | 5 | 3 | 1 | 2 |

In Tables 1 and 2, the amount (% by mass) of water in the ink was noted by rounding off the number after the decimal point.

In Tables 1 and 2, the blank indicates that the corresponding component is not present.

In Tables 1 and 2, the "transfer" in the columns of the "evaluation results" indicate the transfer of the overcoat layer in Examples 1 to 26 and Comparative Example 1 to 7 or indicates the transfer of the cyan solid image in Comparative Example 8.

In Tables 1 and 2, the impermeable base materials are as follows.

PET: polyethylene terephthalate film "FE2001" (thickness of 25 μm), manufactured by Futamura Chemical Co., Ltd.

OPP: biaxially oriented polypropylene film "P6181" (thickness of 25 μm), manufactured by Toyobo Co., Ltd.

In Tables 1 and 2, the aggregating agents in the aggregating liquid are as follows.

MA: malonic acid (manufactured by Wako Pure Chemical Industries, Ltd.; dicarboxylic acid)

AA: acetic acid (manufactured by Wako Pure Chemical Industries, Ltd.; monocarboxylic acid)

MgSO$_4$: magnesium sulfate (manufactured by Wako Pure Chemical Industries, Ltd.; polyvalent metal salt)

CA: calcium acetate (manufactured by Wako Pure Chemical Industries, Ltd.; polyvalent metal salt)

In Tables 1 and 2, the resin particles in the aggregating liquid are as follows.

PE1: Eastek 1200 (manufactured by Eastman Chemical Company, polyester resin particles, volume average particle diameter of 30 nm)

PU1: SUPERFLEX E-4800 (manufactured by DKS Co., Ltd., polyurethane resin particles, volume average particle diameter of 300 nm)

PE2: PLASCOAT RZ570, (Goo Chemical Co., Ltd., polyester resin particles, volume average particle diameter of 25 nm)

In Tables 1 and 2, in a ease where the columns of "organic solvents A or other solvents", the columns of "organic solvents A", two lines of the columns of "organic solvents B or other solvents", and the columns of "water" are blanks, this indicates that the corresponding components are not contained.

In Tables 1 and 2, the organic solvents (organic solvents other than the organic solvents A and the organic solvents B) and are as follows.

The 20% vapor pressure (the unit is kPa; noted as "20° C. VP" in Table 1) and the SP value (the unit is MPa$^{1/2}$; noted as "SP" in Table 1) of each solvent are as listed in Table 1.

1,2-PD: 1,2-propanediol (manufactured by Wako Pure Chemical Industries, Ltd.)

1,3-PD: 1,3-propanediol (manufactured by Wako Pure Chemical Industries, Ltd.)

1,2-BD: 1,2-butanediol (manufactured by Wako Pure Chemical Industries, Ltd.)

GL: glycerin (manufactured by Wako Pure Chemical Industries, Ltd.)

PGmBE: propylene glycol monobutyl ether (manufactured by Wako Pure Chemical Industries, Ltd.)

PGmME: propylene glycol monomethyl ether (manufactured by Wako Pure Chemical Industries, Ltd.)

PGmPE: propylene glycol monopropyl ether (manufactured by Wako Pure Chemical Industries, Ltd.)

EGmPE: ethylene glycol monopropyl ether (manufactured by Wako Pure Chemical Industries, Ltd.)

2-ME: 2-methoxyethanol (manufactured by Wako Pure Chemical Industries, Ltd.)

TOL: toluene (manufactured by Wako Pure Chemical Industries, Ltd.)

IPA: isopropyl alcohol (manufactured by Wako Pure Chemical Industries, Ltd.)

BA: butyl acetate (manufactured by Wako Pure Chemical Industries, Ltd.)

EA: ethyl acetate (manufactured by Wako Pure Chemical Industries, Ltd.)

In Tables 1 and 2, $I_{SP}$, $O_{SP}$, and $I_{SP}$--$O_{SP}$ each represent an average SP value (the unit is MPa$^{1/2}$) of the organic solvents A contained in the ink, the average SP value $O_{SP}$ (the unit is MPa$^{1/2}$) of all liquid components contained in the overcoat liquid, and a difference obtained by subtracting $O_{SP}$ from $I_{SP}$.

In Tables 1 and 2, the resins in the overcoat liquids are as follows.

PU2: the above-described polyurethane resin PU2

PU3: the above-described polyurethane resin PU3

PA1: the above-described polyamide resin PA1

In Tables 1 and 2, the inorganic particles in the overcoat liquid are as follows. The Mohs hardness of each inorganic particle species is as listed in Tables 1 and 2.

TiO$_2$ (R): rutile type titanium oxide particles CR-50 (manufactured by Ishihara Sangyo Kaisha, Ltd., average volume particle diameter of 0.25 μm)

TiO$_2$ (A): anatase type titanium oxide particles A-220 (manufactured by Ishihara Sangyo Kaisha, Ltd., average volume particle diameter of 0.16 μm)

BaSO4: barium sulfate particles BARIACE 34 (manufactured by Sakai Chemical Industry Co., Ltd., volume average particle diameter of 0.30 μm)

As listed in Tables 1 and 2, in Examples 1 to 26 in which the ink which contained a coloring material, water, and the organic solvents A having a vapor pressure of 0.20 kPa or less at 20° C. (VP at 20° C. in Tables 1 and 2) and in which the content of the organic solvents A was 10% by mass or greater with respect to the total amount of the ink; the aggregating liquid which contained an aggregating agent aggregating the components in the ink and water; and the overcoat liquid which contained a resin and the organic solvents B having a vapor pressure of 2.50 kPa or greater at 20° C. and in which the content of the organic solvents B was 10% by mass or greater with respect to the total amount of the overcoat liquid were used, an image with an excellent image quality and an overcoat layer which is unlikely to be transferred are formed, and the jetting stability of the ink was excellent. Each image coated with the overcoat layer, formed in Examples 1 to 26, has excellent adhesiveness to the impermeable base material.

In contrast to these examples, in Comparative Example 1 in which the ink did not contain the organic solvent A and contained another solvent (2-ME; 2-methoxyethanol) having a vapor pressure of greater than 0.20 kPa at 20° C., the jetting stability of the ink was degraded.

In Comparative Example 2 in which the ink contained the organic solvent A, and the content of the organic solvent A was less than 10% by mass with respect to the total amount of the ink, the jetting stability of the ink was degraded.

In Comparative Example 3 in which the overcoat liquid contained the organic solvent B (EA; ethyl acetate), and the content of the organic solvent B was 10% by mass with respect to the total amount of the overcoat liquid, the transfer of the overcoat layer was not able to be suppressed.

In Comparative Examples 4 and 5 in which the overcoat liquid did not contain the organic solvent B (EA; ethyl acetate) and contained another solvent (1,2-PD; 1,2-propanediol, BA; butyl acetate) having a vapor pressure of less than 2.50 kPa at 20° C., the transfer of the overcoat layer was not able to be suppressed.

In Comparative Examples 6 to 8 in which the aggregating liquid was not used, it was found that the image quality and the adhesiveness to the impermeable base material were significantly deteriorated.

As shown in the comparison between Comparative Example 4 and Comparative Example 7, the transfer of the overcoat layer was not found in Comparative Example 7 in which the aggregating liquid was not used while the transfer of the overcoat layer was found in Comparative Example 4 in which the aggregating agent was used. Based on the results, it was found that the problem of the transfer of the overcoat layer is a problem specific to the image forming method carried out using the aggregating liquid and the overcoat liquid.

Further, in Comparative Example 8 in which the aggregating liquid and the overcoat liquid were not used, it was found that the transfer of the cyan solid image was not problematic (scored as "3" in the evaluation standards) compared to the transfer of the overcoat layer in Comparative Example 4. It was also found that the problem of the transfer of the overcoat layer is a problem specific to the image forming method carried out using the aggregating liquid and the overcoat liquid based on the above-described results.

Based on the results of Examples 1 to 4 and 23 to 26, it was found that in a case where at least one organic solvent A had a vapor pressure of 0.10 kPa or less at 20° C. (Examples 1 to 3 and 23 to 26), the jetting stability of the ink was further improved.

Based on the results of Examples 11 to 14, it was found that in a case where the content of the organic solvent B was 25% by mass or greater with respect to the total amount of the overcoat liquid (Examples 11 to 13), the transfer of the overcoat layer was further suppressed.

Based on the results of Examples 1 to 10, it was found that in a case where an expression of "$I_{SP}-O_{SP}>3$" was satisfied (Examples 1 to 7), the transfer of the overcoat layer was further suppressed. The reason why the transfer was suppressed is considered that the stickiness of the overcoat layer caused by transition of the organic solvent from the image to the overcoat layer on the image was further suppressed.

Based on the results of Examples 1 and 16, it was found that in a case where the aggregating liquid contained the resin particles (Example 1), the adhesiveness between the impermeable base material and the image with the overcoat layer was further improved.

Based on the results of Examples 1 and 17 to 19, it was found that in a case where the overcoat liquid contained inorganic particles (Examples 1, 17, and 18), the transfer of the overcoat layer was further suppressed.

Based on the results of Examples 1, 17, and 18, it was found that in a case where the Mohs hardness of the inorganic particles was 4 or greater (Examples 1 and 17), the transfer of the overcoat layer was further suppressed.

Examples 101 to 103

The same operation as in Example 1 was performed except that the mass of the aggregating liquid to be applied and/or the mass of the overcoat liquid to be applied was changed as listed in Table 3.

The results are listed in Table 3.

TABLE 3

| | Mass of aggregating liquid to be applied (g/m$^2$) | Mass of aggregating liquid to be applied (g/m$^2$) | Applied mass ratio [overcoat liquid/aggregating liquid] | Evaluation results | | | |
|---|---|---|---|---|---|---|---|
| | | | | Jetting stability | Transfer | Image quality | Adhesion |
| Example 1 | 1.7 | 6.0 | 3.5 | 5 | 5 | 5 | 5 |
| Example 101 | 1.7 | 3.0 | 1.8 | 5 | 5 | 5 | 5 |
| Example 102 | 2.0 | 2.0 | 1.0 | 5 | 4 | 5 | 4 |
| Example 103 | 2.0 | 1.0 | 0.5 | 5 | 3 | 5 | 4 |

As listed in Table 3, it was found that in a case where the ratio of the mass of the overcoat liquid to be applied to the mass of the aggregating liquid to be applied [overcoat liquid/aggregating liquid] was 1.0 or greater, the transfer of the overcoat layer was further suppressed.

As described above, the group of examples using the cyan ink has been described, but it goes without saying that the same effects as the effects of the above-described group of the examples can be obtained even in a case where the cyan ink was changed to an ink (for example, a magenta ink, a yellow ink, or a black ink) other than the cyan ink in the group of the examples or a multicolor image was formed using at least one ink other than the cyan ink in addition to the cyan ink.

The disclosure of JP2017-190329 filed on Sep. 29, 2017 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:
1. An image forming method comprising:
   a step of preparing an ink which contains a coloring material, water, and an organic solvent A having a vapor pressure of 0.20 kPa or less at 20° C. and in which a content of the organic solvent A is 10% by mass or greater with respect to a total amount of the ink;
   a step of preparing an aggregating liquid which contains an aggregating agent aggregating components in the ink and water;
   a step of preparing an overcoat liquid which contains a resin and an organic solvent B having a vapor pressure of 2.50 kPa or greater at 20° C. and in which a content of the organic solvent B is 25% by mass or greater with respect to a total amount of the overcoat liquid;

a step of applying the aggregating liquid onto an impermeable base material;

a step of applying the ink to at least a portion of a region in the impermeable base material to which the aggregating liquid has been applied according to an ink jet method to form an image; and a step of applying the overcoat liquid onto the region to which the aggregating liquid has been applied in the impermeable base material, on which the image has been formed, to form an overcoat layer, wherein a content of the water in the overcoat liquid is 20% by mass or less with respect to the total amount of the overcoat liquid.

2. The image forming method according to claim 1, wherein at least one of the organic solvent A contained in the ink has a vapor pressure of 0.10 kPa or less at 20° C.

3. The image forming method according to claim 1, wherein in the overcoat liquid, a content of an organic solvent which has a vapor pressure of 0.10 kPa or less at 20° C., is 10% by mass or less with respect to the total amount of the overcoat liquid.

4. The image forming method according to claim 1, wherein in a case where a unit of an SP value is set as $MPa^{1/2}$, an average SP value of the organic solvents A contained in the ink is set as $I_{SP}$, and an average SP value of all liquid components contained in the overcoat liquid is set as $O_{SP}$, an expression of $I_{SP} - O_{SP} \geq 3$ is satisfied.

5. The image forming method according to claim 1, wherein the aggregating liquid contains resin particles.

6. The image forming method according to claim 1, wherein the overcoat liquid contains inorganic particles.

7. The image forming method according to claim 6, wherein at least one kind of the inorganic particles contained in the overcoat liquid has a Mohs hardness of 4 or greater.

8. The image forming method according to claim 1, wherein the impermeable base material is a resin base material.

9. The image forming method according to claim 1, wherein the aggregating agent is at least one selected from the group consisting of a polyvalent metal compound, an organic acid or a salt thereof, and a metal complex.

10. The image foaming method according to claim 1, wherein a ratio of a mass of the aggregating liquid to be applied per unit area to a mass of the overcoat liquid to be applied per unit area is 1.0 or greater.

11. An ink set comprising:

an ink which contains a coloring material, water, and an organic solvent A having a vapor pressure of 0.20 kPa or less at 20° C. and in which a content of the organic solvent A is 10% by mass or greater with respect to a total amount of the ink;

an aggregating agent which aggregates components in the ink and an aggregating liquid containing water; and an overcoat liquid which contains a resin and an organic solvent B having a vapor pressure of 2.50 kPa or greater at 20° C. and in which a content of the organic solvent B is 25% by mass or greater with respect to a total amount of the overcoat liquid, wherein a content of the water in the overcoat liquid is 20% by mass or less with respect to the total amount of the overcoat liquid.

* * * * *